(12) United States Patent
Byron et al.

(10) Patent No.: US 7,140,702 B2
(45) Date of Patent: Nov. 28, 2006

(54) MEDIUM VOLTAGE MOTOR CONTROL CENTER ARC RESISTANT ENCLOSURE

(75) Inventors: Eldridge R. Byron, Murfreesboro, TN (US); Gregory O. Motley, Smyrna, TN (US); Mary B. Groff, Winchester, TN (US)

(73) Assignee: Square D Company, Palatine, IL (US)

( * ) Notice: Subject to any disclaimer, the term of this patent is extended or adjusted under 35 U.S.C. 154(b) by 547 days.

(21) Appl. No.: 10/027,458

(22) Filed: Dec. 21, 2001

(65) Prior Publication Data

US 2003/0117045 A1   Jun. 26, 2003

(51) Int. Cl.
  *A47B 53/00*   (2006.01)
(52) U.S. Cl. .................. 312/296; 312/223.1; 312/236; 312/283; 312/329
(58) Field of Classification Search ............... 312/107, 312/111, 209, 213, 223.1, 236, 296, 283, 312/289, 290, 326, 329; 52/789.1, 589.1, 52/584.1, 592.1, 588.1; 49/292, 395, 402
See application file for complete search history.

(56) References Cited

U.S. PATENT DOCUMENTS

| | | | | |
|---|---|---|---|---|
| 1,299,232 A * | 4/1919 | Rosenberg | ............... | 29/525.11 |
| 1,371,482 A * | 3/1921 | Hauserman et al. | ........... | 49/395 |
| 2,064,439 A * | 12/1936 | McWhirter | ................. | 312/296 |
| 2,482,983 A * | 9/1949 | Lambert | ..................... | 114/117 |
| 2,645,743 A * | 7/1953 | De Smidt | ................... | 200/293 |
| 2,774,808 A * | 12/1956 | Bullock | ...................... | 174/16.1 |
| 5,124,881 A * | 6/1992 | Motoki | ....................... | 361/605 |
| 5,137,340 A * | 8/1992 | Cugley et al. | ........... | 312/234.5 |
| 5,193,049 A * | 3/1993 | Jackson | ...................... | 361/676 |
| 5,574,624 A * | 11/1996 | Rennie et al. | ............. | 361/676 |
| 5,689,097 A * | 11/1997 | Aufermann et al. | ........ | 218/157 |
| 5,710,402 A * | 1/1998 | Karnbach et al. | ........... | 218/157 |
| 5,767,440 A * | 6/1998 | Byron et al. | ............ | 174/17 VA |
| 6,104,003 A * | 8/2000 | Jones | ......................... | 219/400 |
| 6,298,681 B1 * | 10/2001 | Esty et al. | .................... | 62/277 |
| 6,382,749 B1 * | 5/2002 | Stetson | ....................... | 312/308 |
| 6,410,844 B1 * | 6/2002 | Bruner et al. | ........... | 174/17 VA |

* cited by examiner

*Primary Examiner*—Peter M. Cuomo
*Assistant Examiner*—Joseph Edell

(57) ABSTRACT

A medium voltage controller for electrical equipment, such as motors, transformers, reactors, and capacitors, having an arc resistant cabinet, swaged internal electrical connections, a one-piece self-aligning withdrawable finger cluster, a pull-out instrument compartment, a load discharge device, cast fuse holders, disconnect switch, a switch illuminator, low power current transformers, and an optical temperature measuring system. The arc resistant cabinet relies on the pressure generated by an arc fault to provide the sealing action to contain the fault forces. The cabinet's rear panels are inside the cabinet and the panel lips mate to edges of the cabinet opening. The front doors each have a series of latching tabs along one side and a hinge along the opposing side. A dimple-in-a-dimple joint provides shear strength for panel joints. At the top of the cabinet is an exhaust vent.

14 Claims, 24 Drawing Sheets

MEDIUM VOLTAGE MOTOR CONTROL CENTER ARC RESISTANT ENCLOSURE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of Invention

This invention pertains to an enclosure for a medium voltage motor controller. More particularly, this invention pertains to an enclosure that is arc resistant.

BRIEF SUMMARY OF THE INVENTION

A medium voltage controller for electrical equipment, such as motors, transformers, reactors, and capacitors, is provided. The controller is a one-high unit, that is, a single contactor in a full-height cabinet, with the contactor mounted near the base of the controller, the fuses and grounding switch located near the vertical center, the disconnect switch mounted above the fuses, and the controller's instrument compartment located in the upper portion of the controller. The motor controller uses cast components to minimize components, fabrication steps, maintenance, and heat rise.

The motor controller is enclosed in an arc resistant cabinet, which uses the pressure generated by a fault to provide the sealing action to contain the fault forces. The rear, removable panels are inside the cabinet and engage lips surrounding the cabinet opening. Pressure inside the cabinet forces the panels against the inside surface of the cabinet and distributes the resulting load over a large area. The front access doors each have a continuous hinge and multiple latching tabs. The sheet metal panels of the cabinet are secured with a dimple-in-a-dimple feature, which provides strength and rigidity to the cabinet. At points where the panels are secured, each sheet metal part is formed with a dimple having a fastener hole in its center. The corresponding dimples in each sheet metal part are mated and fastened.

Another feature of the motor controller is the swaged connections, which are used for making internal electrical connections. A swaged connection includes a terminal or connector having a barrel, into which cable conductor is inserted. The portion of the barrel enclosing the cable conductor is compressed such that the cable conductor is cold-welded to the barrel.

The pull-out contactor has a withdrawable finger cluster formed of a one piece, self-aligning formed part that electrically mates with stabs inside the cabinet. The fingers are formed from conductive material that does not require additional springs to ensure proper electrical contact.

The controller's instrument compartment is mounted in the upper portion of the controller. To aid in fabrication and maintenance, the instrument compartment includes a removable panel, which is modular and on which the instruments are wired and mounted. The instrument panel swings out of the controller to provide access to the main bus and line-side surge arrestors.

The contactor assembly is mounted on a truck and moves on a rail system that includes a pull-down handle with rails. The truck rolls out of the cabinet on the extended rails for easy removal from the cabinet. The truck, and contactor assembly, is racked in by pushing the truck into the cabinet and then raising the handle, which forces the draw-out fingers to engage the contact stabs.

A load discharge device (LDA) is included for grounding the load before the contactor can be removed from the controller. The LDA has a scissors-type closing mechanism, which, when actuated after being charged, causes a bar to contact each of the load conductors.

The fuses are mounted independently from the contactor assembly. The fuse spring clips are attached to a cast housing that provides corona protection and, in the case of the upper fuse clip housing, serves as the lower contact for the disconnect switch.

Each phase of the disconnect switch is formed of four conducting cast components. The cast upper switch contact includes a flat contact surface to which the main bus is connected. The cast lower switch contact includes the upper fuse clip housing. The cast configuration eliminates multiple connections, which are susceptible to high resistance and, consequently, heating. Electrical continuity between each of the two switch contacts is provided by two parallel plates that contact the two switch contacts by the disconnect switch operating mechanism. In the open position, the disconnect switch is earthed.

The disconnect switch has a window through which the equipment operator can view the position of the disconnect switch when the switch illuminator is actuated. An LED is positioned to shine light into the disconnect switch to illuminate the switch components. The LED is actuated by a manual switch and is powered by a portable power supply.

Low power current transformers are positioned near the load side of the contactor. The low power current transformer is a wide-range current transformer that provides amperage information to the protective metering devices from 0 amperes to 800 amperes, or more.

Internal temperature monitoring is performed by an optical temperature measuring system. Crystals are mounted on components that could experience elevated temperatures, such as the bus connections and the draw-out stabs. A pair of non-conductive fiber optic cables are connected between each crystal and a temperature sensor. The temperature sensor transmits an optical signal through a fiber optic cable and into the crystal. The signal excites the crystal and the temperature sensor receives the resulting fluorescence signal and determines the temperature of the crystal.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
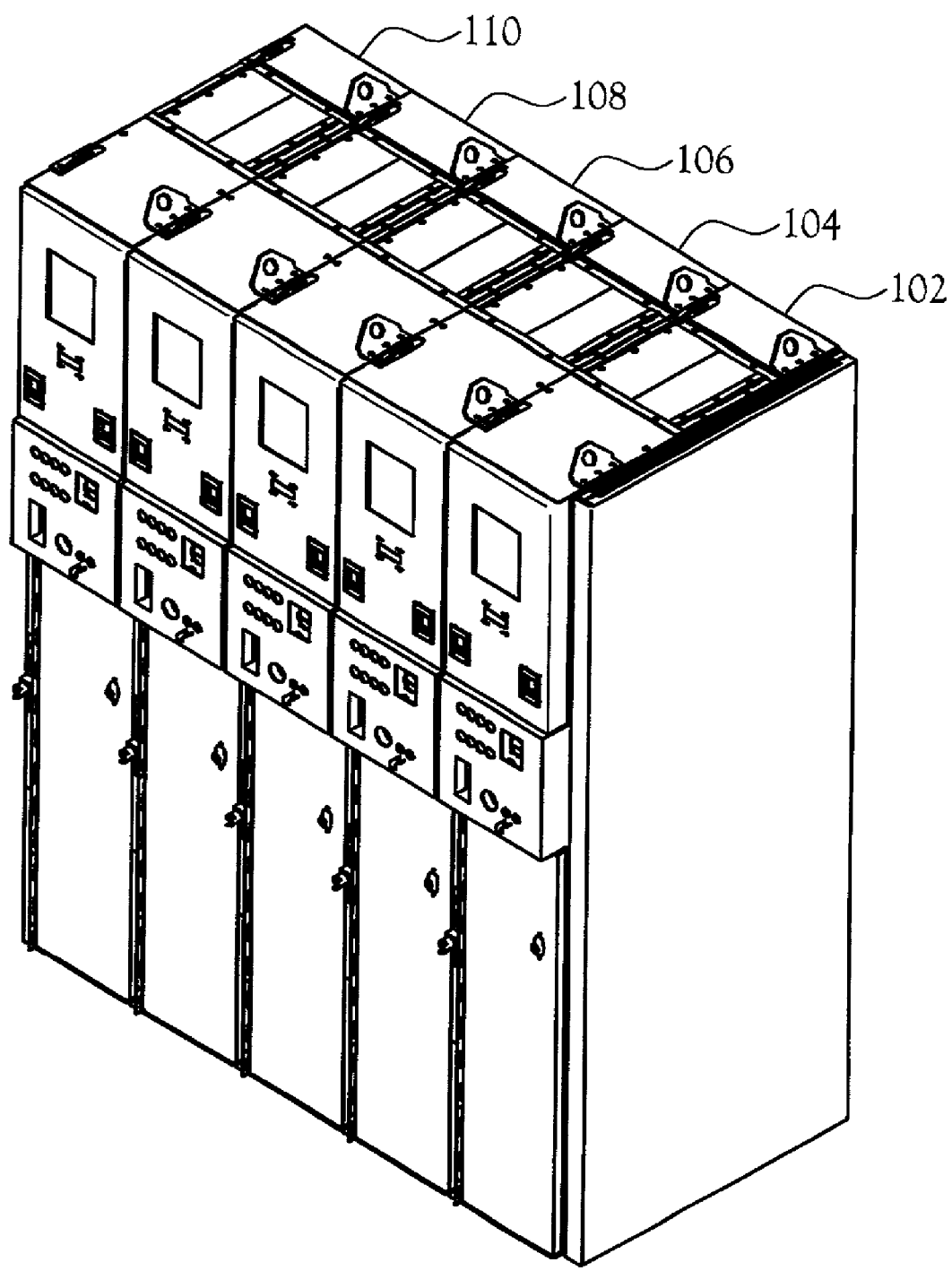
FIG. 1 is a perspective view of a group of five controllers.

An apparatus for controlling medium voltage electrical equipment, such as motors, transformers, reactors, and capacitors, is disclosed. The apparatus, illustrated in FIG. 1 in a five-wide configuration, is a medium voltage motor controller 102, 104, 106, 108, and 110.

Figure 2:
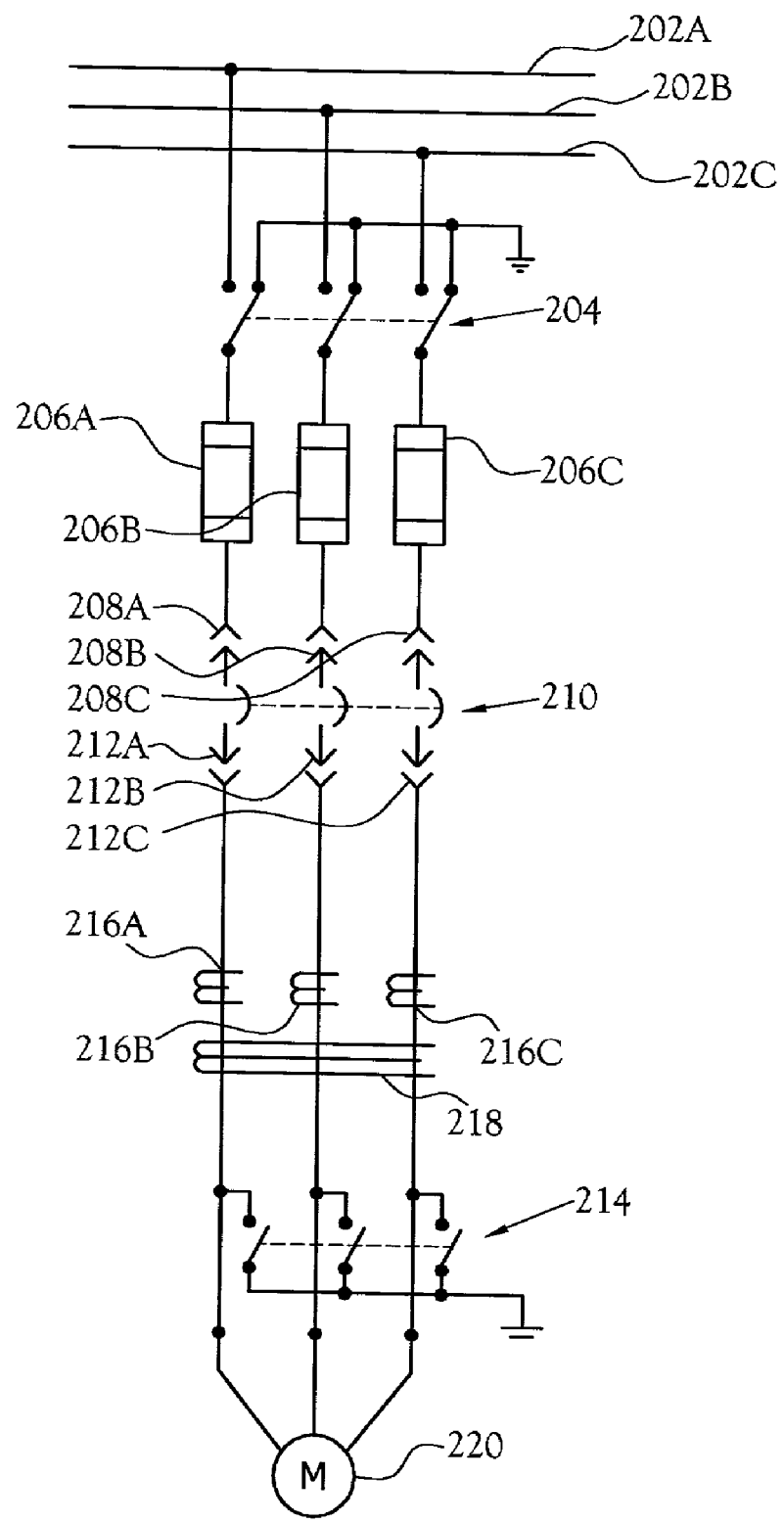
FIG. 2 is a schematic diagram of a controller.

FIG. 2 is a schematic diagram of the controller 102. A three-phase bus 202 connects to a disconnect switch 204, which is connected to a set of fuses 206A, 206B, and 206C. Although the schematic shows one fuse 206 per phase, those skilled in the art will recognize that the physical configuration can include multiple fuses per phase in order to satisfy current carrying and current interrupting requirements. The contactor 210 is connected to the fuses 206 and load 220 through draw-out stabs and connectors 208 and 212. Between the stabs and connectors 212 and the driven motor M or load 220 are a load discharge device 214 and current transformers 216 and 218. The illustrated embodiment controls a motor M load. Those skilled in the art will recognize that the controller 102 can also be used to control transformers, reactors, capacitors, or other electrical equipment or loads without departing from the spirit and scope of the present invention.

Figure 3:
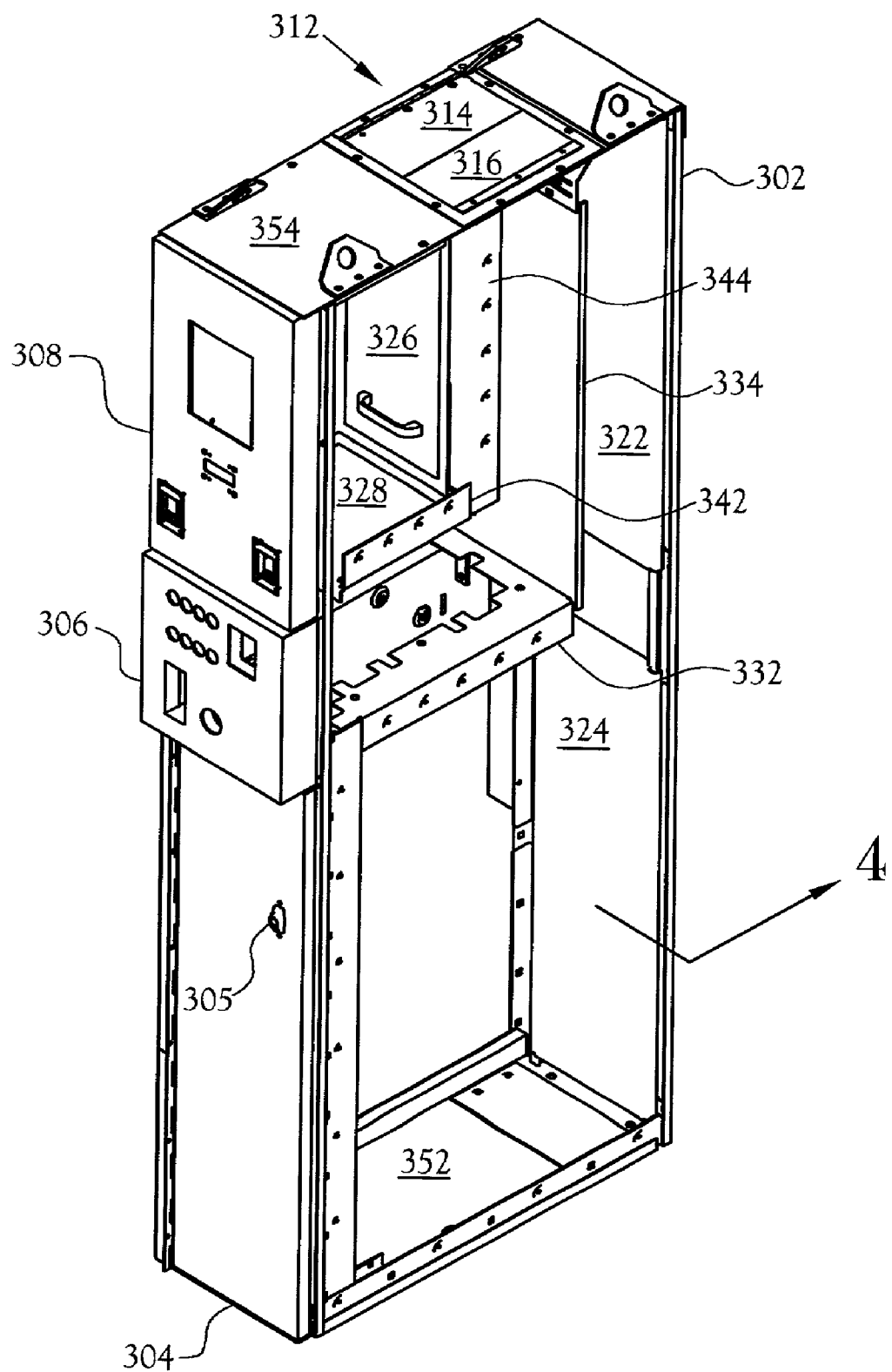
FIG. 3 is a perspective view of a motor controller with one side panel removed.

FIG. 3 illustrates the arc resistant cabinet 302 and the features that permit the cabinet 302 to withstand high-current faults without losing its integrity or damaging nearby equipment or personnel. Arc faults occur when a component, having a potential greater than ground potential, conducts current to ground. An arc fault releases a large amount of energy in a very short period of time. In an enclosure containing a medium or high voltage circuit breaker, when a high current fault occurs an arc is developed that creates hot ionized arc gasses and/or superheated air which cause pressure to build up within the enclosure within a short period [5 to 8 milli-seconds]. This pressure burst [5 to greater than 50 psig] can be so great that the hot arc gasses escape from the enclosure. In fact, the pressure may become so extreme as to cause the doors and side walls of the enclosure to be blown off. Electrical equipment can be designed to withstand arc faults of a specific energy. Typical arc fault ratings for equipment include 25 kA for 1 second duration, 40 kA for 0.5 seconds, and 50 kA for 0.25 seconds. With the addition of re-enforced end walls, the ratings can be increased to 50 kA 1.0 second.

The controller cabinet 302 includes a contactor and fuse door 304, a disconnect switch cover 306, and an instrument compartment door 308. The cabinet 302 further includes a floor panel 352, which is secured to the cabinet 302 and prevents the cabinet 302 from being pushed away from the floor by the arc fault pressure impulse. The instrument compartment 1310 is isolated from the remainder of the inside of the cabinet 302 by two baffles or barriers: a vertical riser 344 and a compartment floor 342. The vertical riser 344 has a removable panel 326 for access to any equipment located behind the riser 344. The compartment floor 342 has a removable panel 328 for access to the bus connections at the disconnect switch. The vertical riser 344 and the compartment floor 342 prevent the arc fault pressure impulse from penetrating the instrument compartment. The disconnect switch 1902 (see FIG. 19) is attached to a mounting plate 332, which is secured to a vertical riser 334. The mounting plate 332 and the vertical riser 334 provide support, but they do not restrict the air flow during an arc fault. Those skilled in the art will recognize that the air flow can be accomplished through orifices or air gaps in the mounting plate 332 and the vertical riser 334.

The contactor and fuse door 304 is secured to the panel by a hinge along one side and by a series of latching tabs along the opposite side that mate with corresponding slots attached to the cabinet 302. (See FIGS. 8A and 8B). The removable panels 322 and 324 are shown in the rear of the cabinet 302. The panels 322 and 324 are installed inside the cabinet 302 and an arc fault pressure impulse seats the panels 322 and 324 against their mating surfaces. The panels 322 and 324 do not rely upon fasteners to provide structural integrity during an arc fault. (See FIGS. 4A and 4B). The top panel 354 of the cabinet 302 includes the arc exhaust vent 314, which is illustrated with the two hinged flaps 314 and 316 in the closed position. (See FIG. 5). The superheated air generated by an arc fault forces the hinged flaps 314 and 316 to open and exhaust, thereby reducing the maximum pressure generated within the cabinet 302. The various surfaces of the cabinet 302 are joined with dimple-in-a-dimple connections 710 (see FIG. 7), which provide joints with a high shear strength.

Figure 4A:
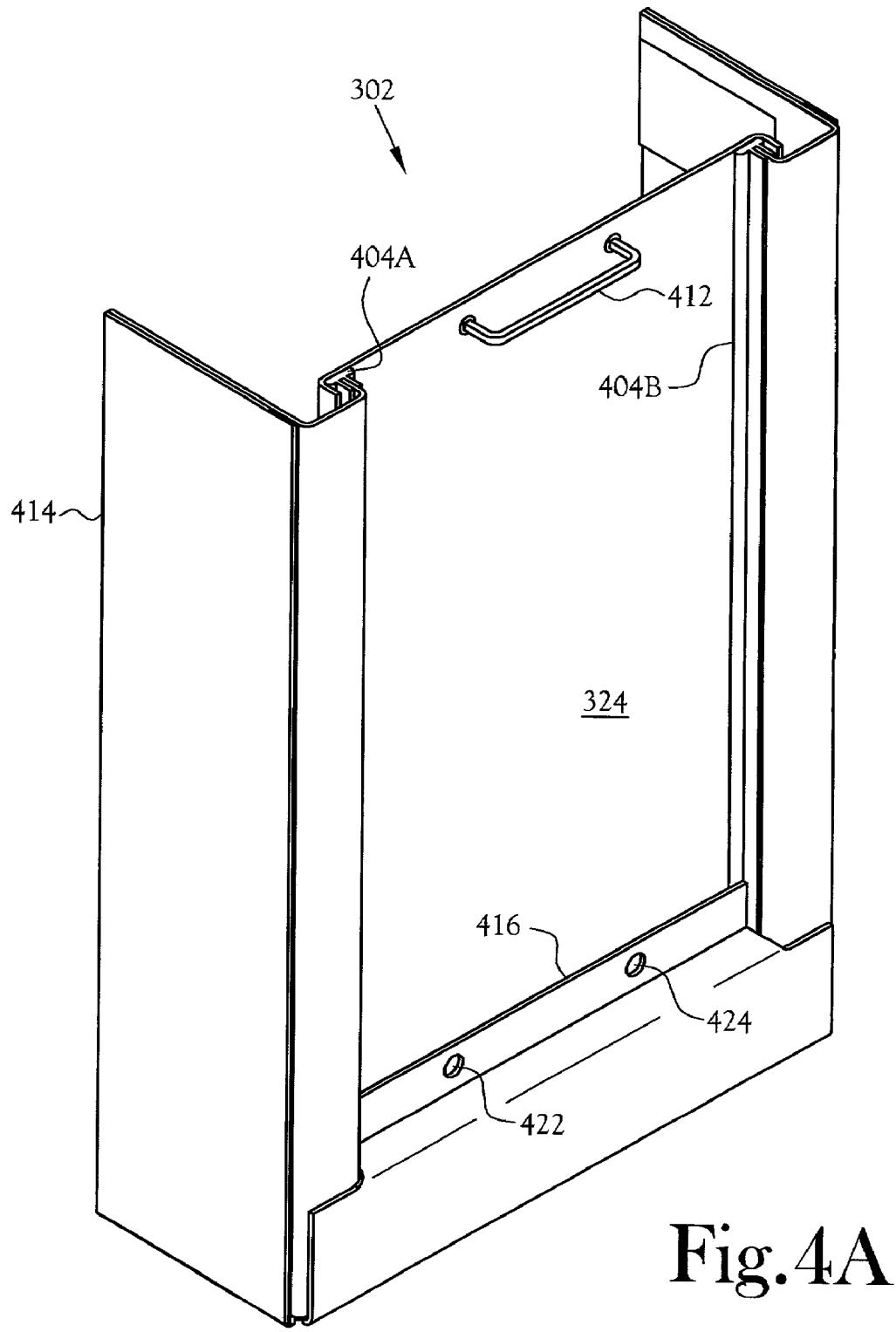
FIG. 4A is a perspective view of a cut-away of a rear panel.

FIG. 4A illustrates a cut-away view of the lower access panel 324 of the cabinet 302. Also shown is the side panel 414, which is not illustrated in FIG. 3. The removable access panel 324 is mounted inside the cabinet 302, and the panel 324 is removed by tilting it inside the cabinet 302 and drawing it out of the opening in the cabinet 302. The removable panel 324 is attached to the cabinet 302 by fasteners inserted through openings 422 and 424 and corresponding openings in the bottom portion of the removable panel 324. In one embodiment, the removable panel 324 has captive nuts to receive the fasteners, thereby allowing the fasteners to secure the panel 324 to the cabinet 302. The top portion of the removable panel 324 is secured in a similar manner. Located on the outside central portion of the panel 324 is a handle 412, which aids in removing or installing the panel 324.

Figure 4B:
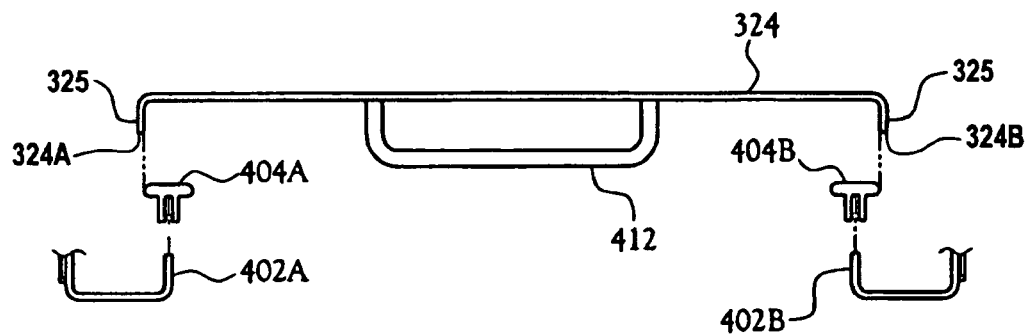
FIG. 4B is a cut-away top view of the rear panel.

FIG. 4B illustrates a section view of the rear panel, or access panel, 324 and the rear of the cabinet 302. The access panel 324 has a flat surface with first and second outwardly turned panel edges 324A and 324B bent to form lips, or protruding members, 325, and the opening in the cabinet 302 has an inwardly turned edge 402 with an elastic sealing strip, or resilient seal, 404 placed over or on the inwardly turned edge 402 of the cabinet 302 or the outwardly turned panel edges 324A and 324B of panel 324. The inwardly turned edge 402 of the cabinet 302 and the sealing strip 404 mate with the removable panel 324 and fit inside the area of the panel 324 defined by the lips 325 of the removable panel 324. Although FIGS. 4A and 4B illustrate lips 325 on opposing sides of the panel 324, in one embodiment the access panel 324 has lips, or protruding members, 325 on all four sides. FIGS. 4A and 4B illustrate the sealing strips 404A and 404B that mate with the inwardly turned edges 402A and 402B. The bottom and top portions 416 of the opening also use a sealing strip, which has a flat shape, that fits between the bottom and top portions 416 and the removable panel 324. Although the illustrated lip 325 is at a right angle to the flat surface of the panel 324, those skilled in the art will recognize that the lip 325 can be formed with an angle sufficient to catch the edge 402 of the cabinet 302 and prevent the panel 324 from being blown through the opening in the cabinet 302 during an arc fault.

During an arc fault, the pressure increase in the cabinet 302 pushes the removable panel 324 against the sealing strip 404, and the force applied to the panel 324 is carried by the inwardly turned edges 402A and 402B of the opening of the cabinet 302, not by any fasteners. Any engagement of the outwardly turned panel edges 324A and 324B of the panel 324 and the inwardly turned edges 402A and 402B of the cabinet 302 resulting from increased pressure during an arc fault prevents the removable panel 324 from being dislodged and maintains the integrity of the cabinet 302. The configuration of the removable panel 324 is such that a large panel 324 and opening, providing easy access to the controller 102 components, can be used with an arc resistant cabinet 302.

Figure 5:
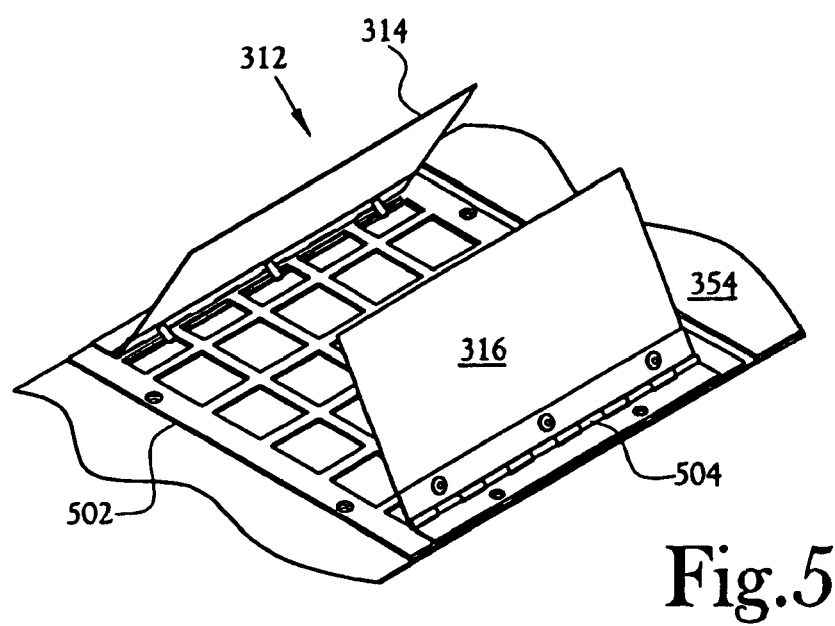
FIG. 5 is a perspective view of an exhaust vent on the top panel of the cabinet.

FIG. 5 illustrates the exhaust vent 312 located on the top panel 354 of the cabinet 302. The vent 312 includes a grate 502 secured to an opening in the top panel 354. The grate 502 has openings that permit air flow with little restriction, but prevent objects from falling into the cabinet 302. The exhaust vent 312 also includes two flaps 314 and 316, each of which is secured at one edge by a hinge 504. The flaps 314 and 316 are held flat against the grate 502 by gravity. During an arc fault, the flaps 314 and 316 are forced open by the pressure impulse of heated air from inside the cabinet 302. The superheated air and any flames are exhausted vertically from the cabinet. In another embodiment, the flaps 314 and 316 are not used, but a duct is attached to the cabinet 302 and directs the heated air away from the cabinet 302 and any objects above the cabinet 302.

Figure 6:
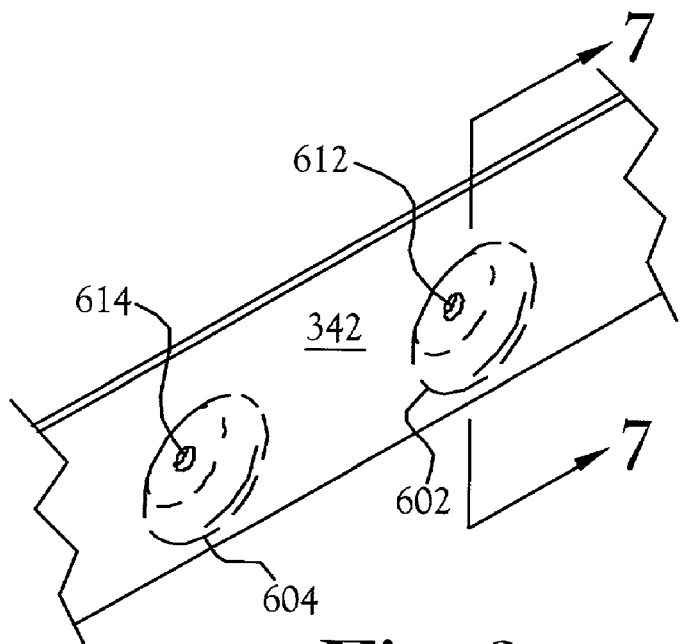
FIG. 6 is a partial view of two mounting dimples.
Figure 7:
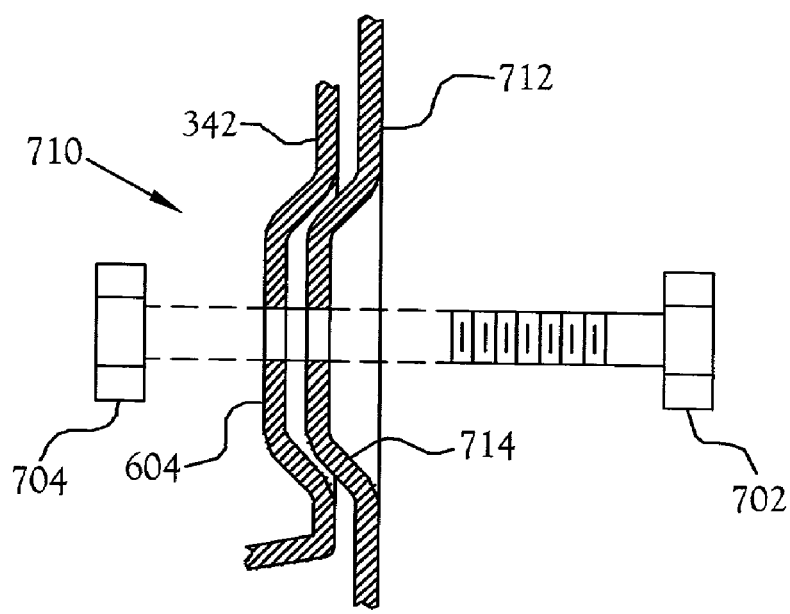
FIG. 7 is a side section view of a dimple-in-a-dimple assembly.

FIG. 6 illustrates a pair of dimples 602 and 604 formed in a sheet metal member 342. Each dimple 602 and 604 has a center aligned hole 612 and 614. FIG. 7 illustrates an exploded cross-section view of the dimple 604 and a panel 712 having a mating dimple 714. A bolt 702 and nut 704 are shown; however, those skilled in the art will recognize that a rivet, sheet metal screw, or other similar fastener can be used to secure the dimples 604 and 714, and, additionally, washers and/or lock washers can be used to secure the fastener 702 and 704.

The dimple-in-a-dimple connection 710 results in a connection with greater shear strength than two flat sheets joined with a fastener, in which the shear strength of the joint is equal to that of the fastener. The area of the panels 342 and 712 in contact when the dimples 604 and 714 mate is the load bearing surface of the joint and provides the shear strength of the dimple-in-a-dimple connection 710. In the illustrated embodiment, the outside dimple 604 and the inside dimple 714 have the same size and configuration, and the mating surface is less than the total concave surface area of the outside dimple 604. In another embodiment, the dimples 604 and 714 have a size and configuration such that the inside dimple 714 is smaller than the outside dimple 604 and the surface area defined by the mating surfaces is maximized. In this embodiment, the dimple-in-a-dimple connection 710 has a greater shear strength than when the dimples 604 and 714 have the same size and configuration.

Figure 8A:
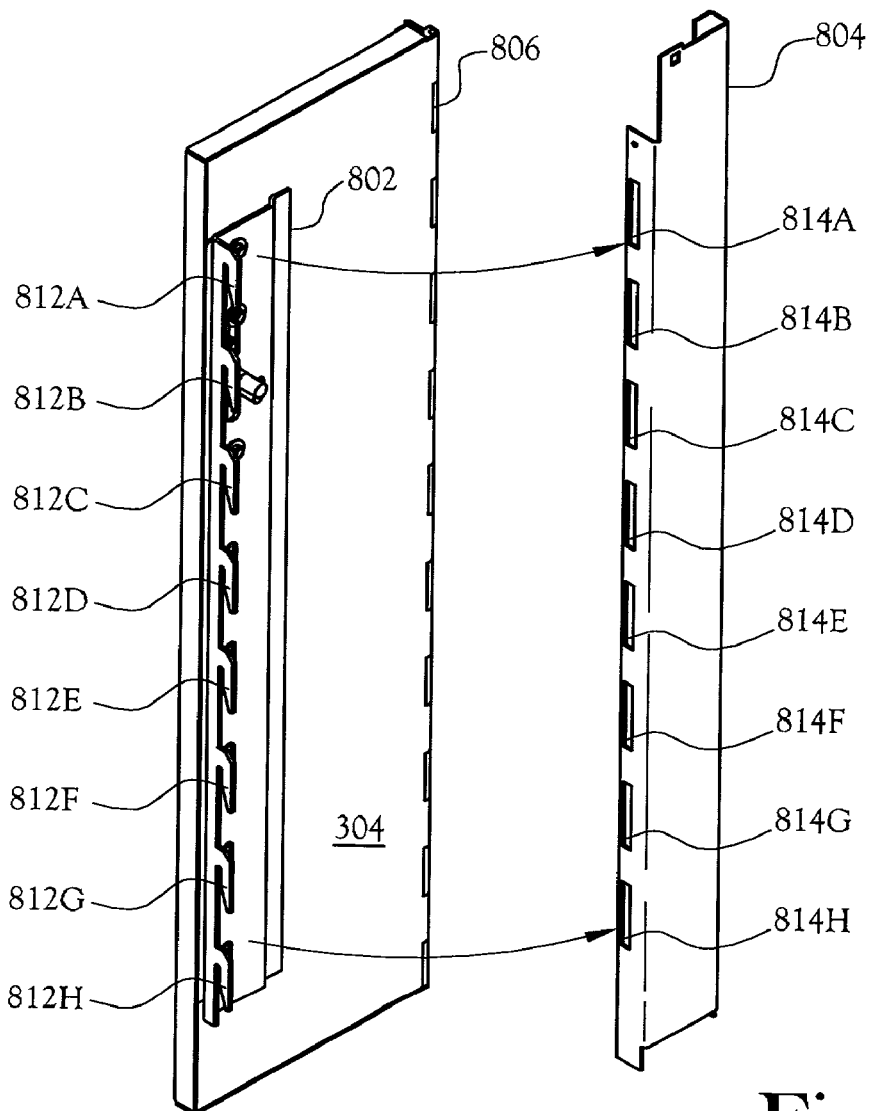
FIG. 8A is a partial perspective view of a front door and latching plate.

FIG. 8A illustrates the front contactor door 304 with its latching mechanism 802 and mating strike assembly 804, which is attached to the cabinet 302. The disconnect switch cover 306 has a similar configuration. The contactor door 304 must remain closed during fault conditions. A hinge 806 secures one side of the door 304. The opposite side of the door 304 is secured by a series of latch hooks 812 on the latching mechanism 802 that engage a series of slotted openings 814 in the strike assembly 804. The latching mechanism 802 is moved by an operator 305 (illustrated in FIG. 3), which moves the latching mechanism 802 upwards vertically to permit opening and closing of the door 304. The operator 305 moves the latching mechanism 802 down to lock the hooks 812 in the corresponding opening 814 in the strike assembly 804. Those skilled in the art will recognize that the latch hooks 812 can be fixed to the cabinet 302 and the strike assembly 804 can be mounted to the door 304 and operated by the operator 305.

Figure 8B:
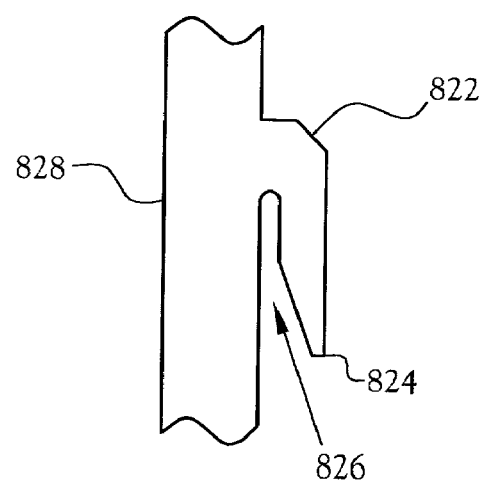
FIG. 8B is a partial plan view of a door latch.

FIG. 8B illustrates a latch hook 822, which is one of the latch hooks 812 illustrated in FIG. 8A, having a tang 824 and a slotted opening 826. The vertical height of the latch 822, from the end of the tang 824 to the top portion of the hood 822, is less than the vertical height of the corresponding opening 814 in the strike assembly 804. The lesser height of the latch 822 allows for free insertion into the corresponding opening 814. Once inserted into the corresponding opening 814, the latch 822 is shifted vertically such that the strike assembly 804 is positioned in the slotted opening 826 of the latch 822. During an arc fault, any pressure on the door 304 will force the surface of the slotted opening 826 adjacent to the tang 824 against the strike assembly 804, thereby preventing the door 304 from being forced open.

Figure 8C:
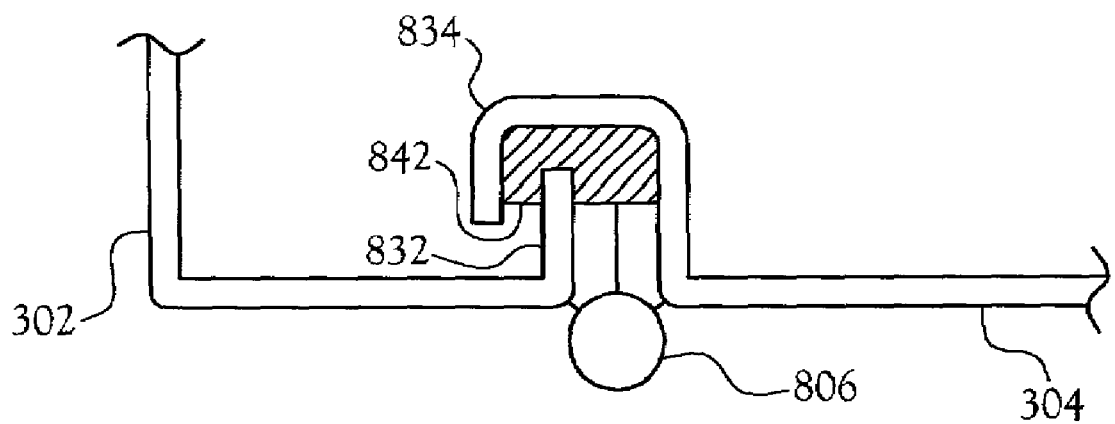
FIG. 8C is a partial plan view of a door hinge.

FIG. 8C illustrates the door hinge 806 and the sealing lip, or channel, 834 over the hinge 806. The hinge 806 side of the door panel 304 has a channel 834 that contains a resilient seal 842 between the channel 834 and a protruding cabinet edge 832. The cabinet 302 has an edge, or first member, 832 that is parallel to and connected to, via a second member, a side wall and formed to fit into the door channel 834 and contact the seal 842 when the door 304 is closed. In the closed position, an arc fault forces the door 304 outwards, and the door channel 834 and seal 842 are forced into the protruding cabinet edge 832, thereby sealing the door 304 and preventing the door 304 from being forced away from the cabinet 302. The configuration of the door channel 834 and the cabinet edge 832 is such that as the door 304 is opened and pivots about the hinge 806, the door channel 834 swings away from the cabinet edge 832 without restriction. This channel 834 and edge 832 configuration is similar to that used to seal the rear panels 324 and 322 to the cabinet 302.

The illustrated embodiment shows a full length, piano-type hinge 806. The hinge 806 does not carry any of the loads associated with an arc fault. Those skilled in the art will recognize that the hinge 806 can be other than a full length hinge and can be a style other than a piano-type hinge without departing from the scope and spirit of the present invention.

Figure 9:
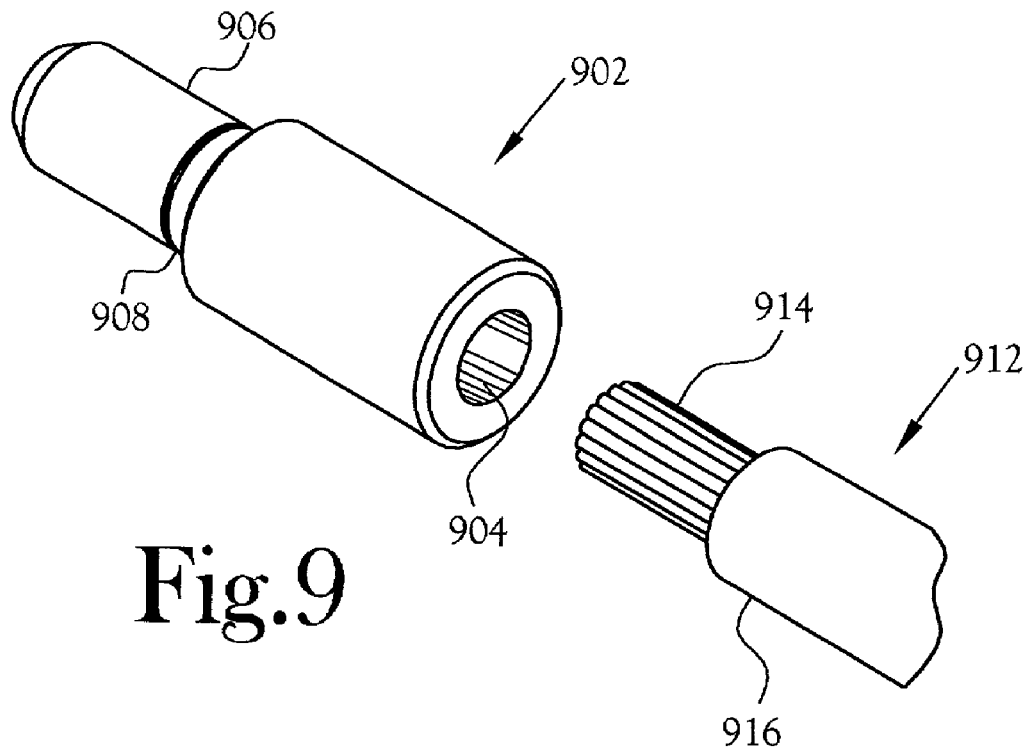
FIG. 9 is a perspective view of a terminal and a cable.
Figure 10:
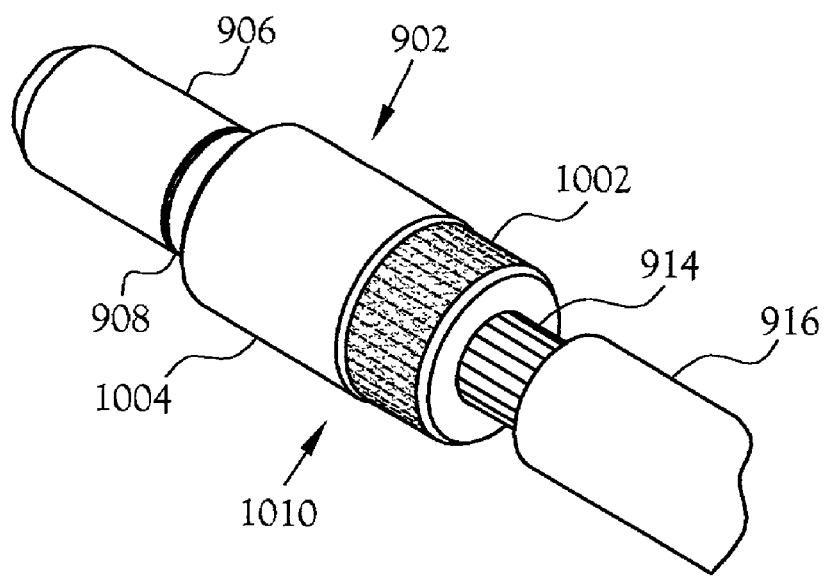
FIG. 10 is a perspective view of a terminal swaged to a cable.

FIG. 9 illustrates a connector 902 and a cable 912 before the conductor 914 is inserted into the connector opening 904. FIG. 10 illustrates the connector 902 with the conductor (conductor end and conductor body) 914 inserted into the connector opening 904 and with the barrel 1004 of the connector 902 swaged, or compressed, at one end 1002 of the barrel 1004. The illustrated connector 902 has a termination portion 906 that is a stab 906, used to make a connection to a finger cluster 1104 (see FIG. 11) on the pull-out contactor. Those skilled in the art will recognize that any of the various connectors or terminals in the motor controller 102 can be swaged without departing from the spirit and scope of the present invention. Illustrated in FIGS. 9 and 10 is a ring groove 908. The connector 902 is fixed or mounted when the stab, or conductive member, 906 is inserted in a hole with the shoulder of the barrel 1004 against one side of the surface and a ring clip against the other side of the surface and the ring clip inserted in the ring groove 908. The conductor 914 is copper, aluminum, or other electrically conductive material.

A swaged, or cold-welded compression, connection 1010 includes a connector 902 having a barrel 1004, into which a conductor 914 is inserted and the barrel end 1002 enclosing the conductor 914 is compressed such that the conductor 914 is cold-welded to the barrel 1004. The end of the cable 912 is cut and a portion of the insulation 916 is removed in a manner similar as with a typical crimp joint connection. After the conductor 914 is inserted into and seated in the barrel 1004, the barrel end 1002 is placed in the jaw of a swaging tool (not illustrated) that compresses the barrel end 1002 and compression welds the barrel end 1002 to the conductor 914. The barrel end 1002 is compressed circumferentially such that, under the compression pressure, the metals of the barrel end 1002 and the conductor 914 cold-flow and fuse to form an electrical and mechanical joint. Unlike the joint formed by crimping, the joint formed by cold-welding extends uniformly around the circumference of the conductor 914. The swaged connection 1010 is wrapped with tape or otherwise sealed in the area between the barrel end 1002 and the cable insulation 916. By swaging the cable 912 and the connectors 902 in the controller 102, the incidence of loose connections and associated temperature rise is reduced, if not eliminated.

In the controller 102, swaged connections 1010 are used on the ends of the interconnecting cables connecting the various internal components of the controller 102. The internal components include, but are not limited to, the contactor stabs 902, the potential transformers, the load-side earthing device lugs 1802, and the line-side surge arrestors. The illustrated embodiment shows a stab connector 902; however, the swaged connections 1010 include, among others, "tee" connectors, lug connectors 1802, and hooked lug connectors.

Figure 11:
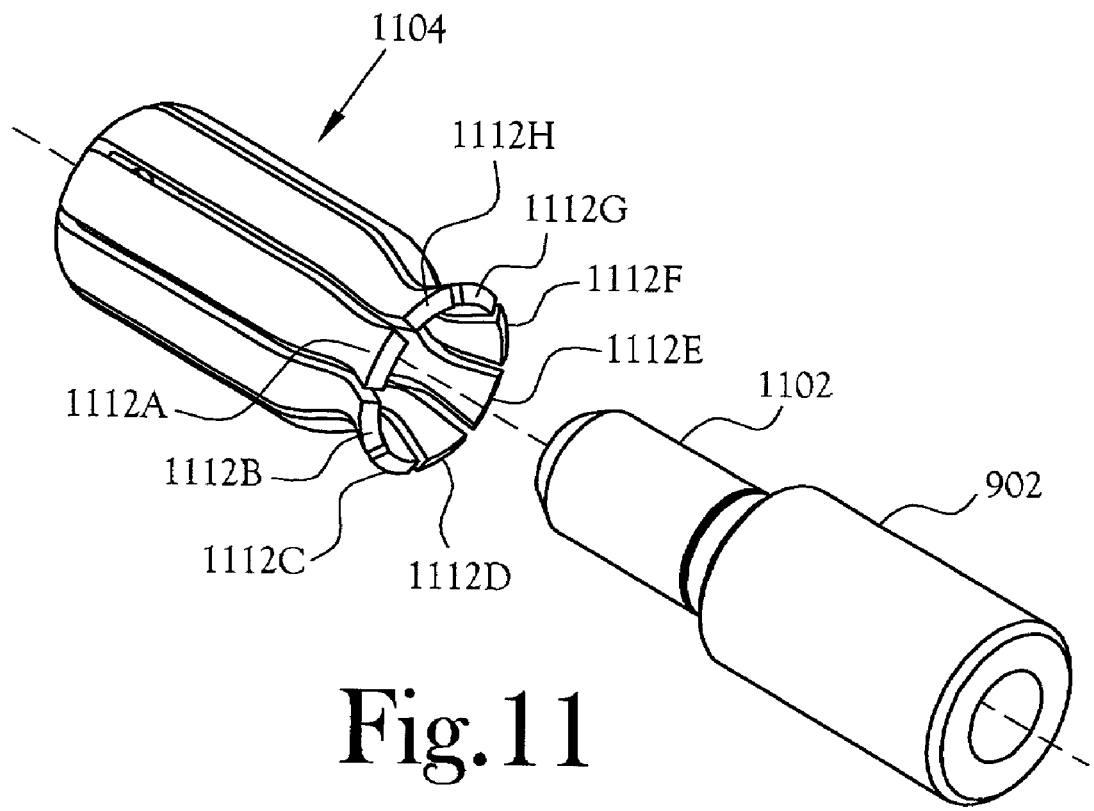
FIG. 11 is a perspective view of a contact finger and a terminal stab.
Figure 12:
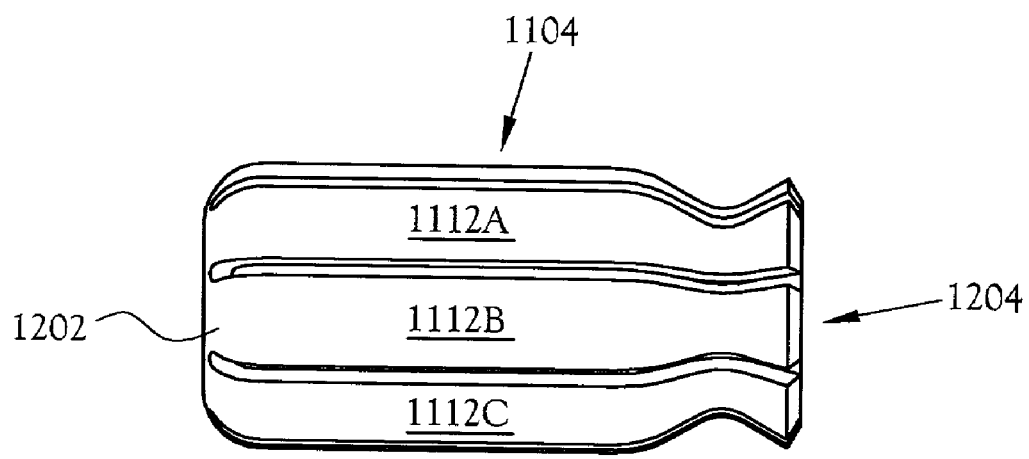
FIG. 12 is a side view of a contact finger and stab.

FIG. 11 illustrates a connector 902 and a mating finger cluster 1104. FIG. 12 illustrates a side view of the finger cluster 1104. The one-piece finger cluster 1104 has an opening in the base 1202 through which the finger cluster 1104 can be electrically and mechanically connected to the draw-out contactor assembly. The means of attaching the base 1202 to the draw-out contactor assembly are known in the art. A source of failure for many prior art controllers has been the current carrying interfaces (fingers or disconnecting means) between the contactor and the stab. The prior art fingers or disconnecting means include separate parts held together by other components and springs. These components jam and oftentimes break, causing the circuit connection to be less than as designed. FIG. 2 shows the schematic representation of the draw-out stabs and connectors 208 and 212.

The illustrated one-piece finger cluster 1104 of the present invention does not require springs. The finger cluster 1104 is copper or other conductive material and is made in the shape of a water vase with slots along its side. The slots separate the individual fingers 1112. Each of the fingers 1112A through 1112H are resilient and apply a spring force when displaced radially away from the longitudinal axis of the finger cluster 1104. When the connector stab 1102 is inserted in the throat 1204 of the finger cluster 1104, the fingers 1112 spring apart, allowing for easy insertion of the connector stab 1102. After insertion of the stab 1102, the opposing pairs of fingers 1112A–1112E, 1112B–1112F, 1112C–1112G, and 1112A–1112G are spring clamps that press against the connector stab 1102 and provide parallel current paths.

In one embodiment, the finger cluster 1104 is cut from a flat sheet of copper or other conductive material. The fingers 1112 are bent perpendicular to the base 1202 and the distal ends of the fingers 1112 define a constricted throat 1204 with a diameter less than the connector stab 1102 diameter when the cluster 1104 is not engaging the stab 1102. The cylindrical shape aids in the control of electrical fields around the finger cluster 1104, thus improving the dielectrics of the system.

Figure 13A:
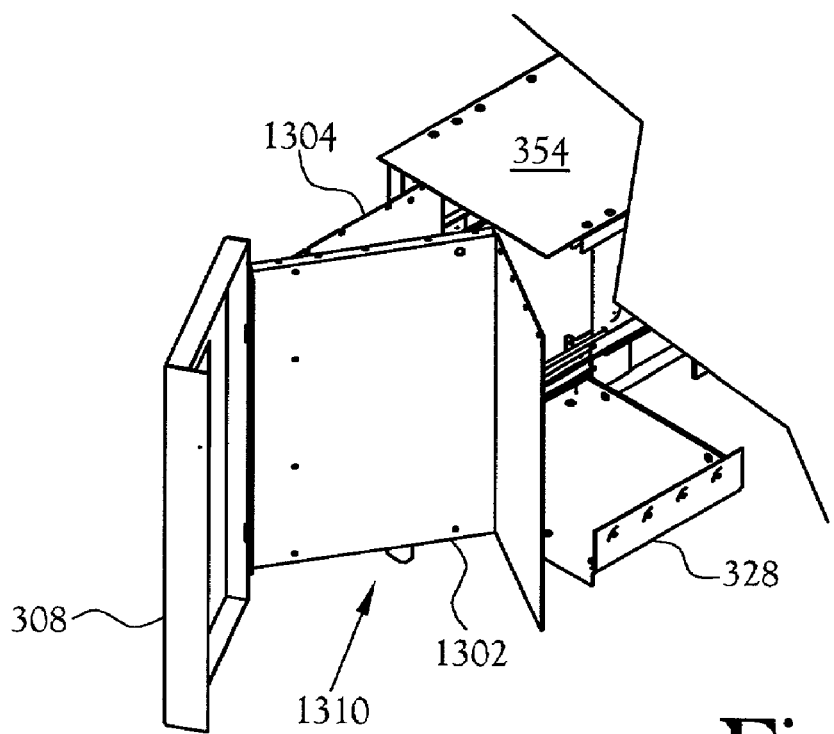
FIG. 13A is a right side perspective view of the instrument compartment with the door open and the instrument panel extended and swung out.
Figure 13B:
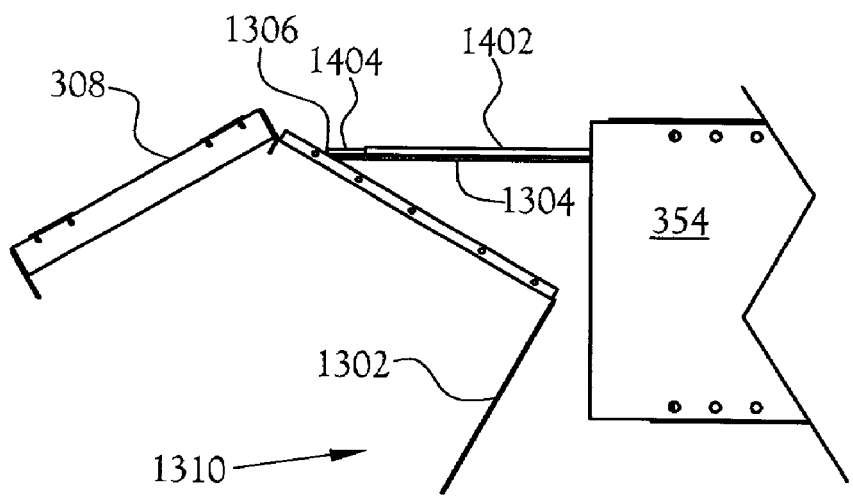
FIG. 13B is a top plan view of the instrument compartment as illustrated in FIG. 13A.

FIG. 13A illustrates a perspective view of the instrument compartment 1310 of the controller 102. FIG. 13B is a top view of the instrument compartment 1310 and cabinet 302 in the position illustrated in FIG. 13A. The instrument compartment 1310 is defined by two barrier panels: the vertical riser 344 and the compartment floor 342. An isolation assembly including the barrier panels 344 and 342 separates the cabinet 302 into two compartments: the instrument compartment 1310 and a high-voltage compartment. (See FIG. 3).

In FIGS. 13A and 13B, the instrument compartment door 308 is open and pulled away from the cabinet 302, and the instrument mounting panel 1302 is partially extended and partially swung away from the slide plate 1304. The instrument mounting panel 1302 is in the disconnect position when the panel 1302 is in the illustrated position. The instrument mounting panel 1302 is a modular removable panel on which the instruments are wired and mounted. The instrument compartment 1310 is isolated from the line and load-side components in the cabinet 302, and serves to prevent inadvertent contact with high-voltage components by the operator.

Visible in FIG. 13B are the outer slide mechanism 1402 and the inner slide mechanism 1404, which together form a telescoping assembly. The inner slide mechanism 1404 is a telescoping member attached to the slide plate 1304. Those skilled in the art will recognize that any of various sliding mechanism configurations can be used without departing from the scope and spirit of the present invention. The instrument mounting panel 1302 is attached to the slide plate 1304 by a panel hinge or other pivoting mechanism 1306. Those skilled in the art will recognize that the telescoping assembly 1402 and 1404 can be attached directly to the instrument mounting panel 1302 without using the slide plate 1304 without departing from the scope and spirit of the present invention.

Figure 14:
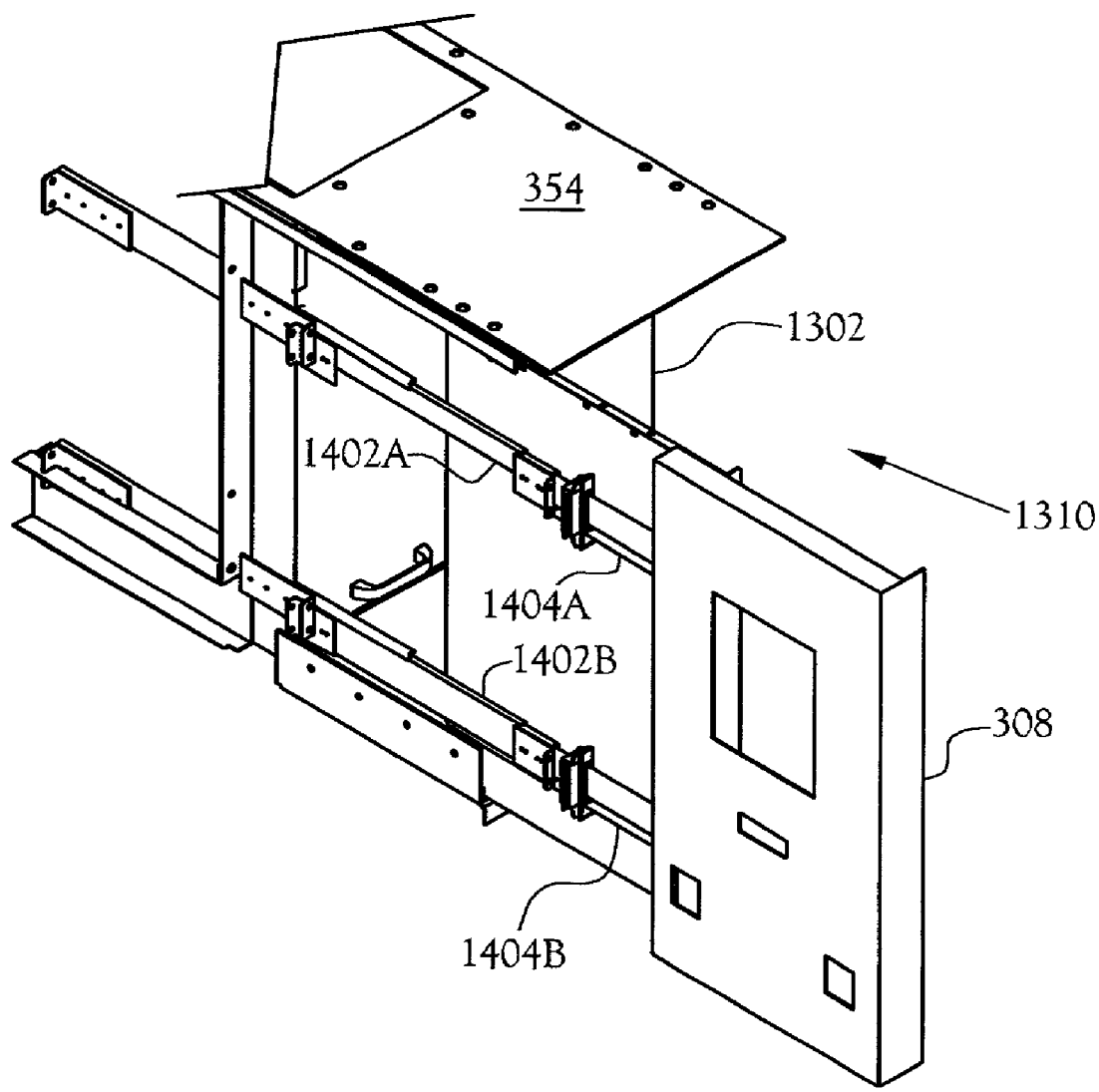
FIG. 14 is a left side perspective view of the instrument compartment with the door open and the instrument panel extended.

FIG. 14 illustrates a perspective view of the instrument compartment 1310 as seen from the left side of the cabinet 302. Shown in this figure are the slide mechanisms 1402 and 1404 that allow the instrument compartment 1310 to be slid out of the cabinet 302. The instrument mounting panel 1302 is shown extending out of the cabinet 302, but it is still flush to the slide plate 1304. In the illustrated position, the instrument mounting panel 1302 is in the test position, and the relaying and wiring mounted on the instrument mounting panel 1302 can be checked and the controller 102 is fully operational.

The instrument compartment 1310 has three primary configurations. First, with the instrument compartment door 308 closed, as illustrated in FIG. 3, the controller 102 is in a fully operational configuration and the components mounted in the instrument compartment 1310 are protected. Second, with the instrument compartment door 308 open and the instrument mounting panel 1302 extending out of the cabinet 302, the instrument compartment 1310 is in a test configuration with the controller 102 fully operational and the components mounted in the instrument compartment 1310 exposed for testing and checking. Third, with the instrument compartment door 308 open and the instrument mounting panel 1302 extending out of the cabinet 302 and swung out away from the cabinet 302, the instrument compartment 1310 is in a disconnect configuration with the controller 102 not operational and the rear panel 326 and the bottom panel 328 (both illustrated in FIG. 3) accessible. In the disconnect configuration, the controller 102 is interlocked with the instrument mounting panel 1302 position and the controller 102 is in the off position, that is, the disconnect switch 1902 is open and the contactor is open. The interlock can be a mechanical linkage and/or an electrical circuit that prevents closing the contactor and/or closing the disconnect switch 1902. The rear panel, or riser, 344 has a removable panel 326 for access to components mounted in the interior of the cabinet 302, such as the line-side surge arrestors. The bottom, or floor, panel 342 has a removable panel 328 for access to the bus connections 2302 to the disconnect switch 1902 (illustrated in FIG. 21).

Figure 15:
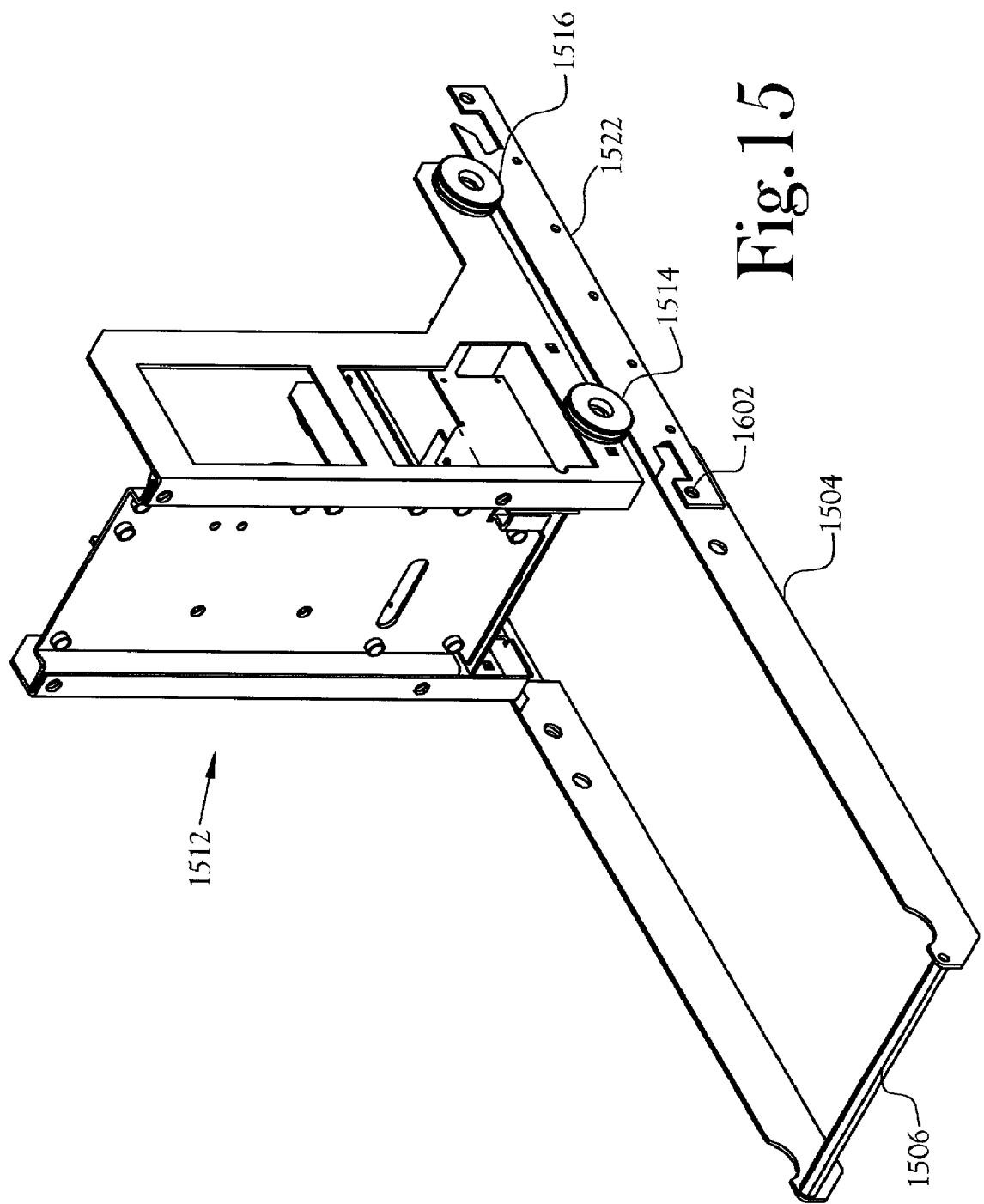
FIG. 15 is a perspective view of the contactor truck resting partially pulled out from its fully inserted position.
Figure 16:
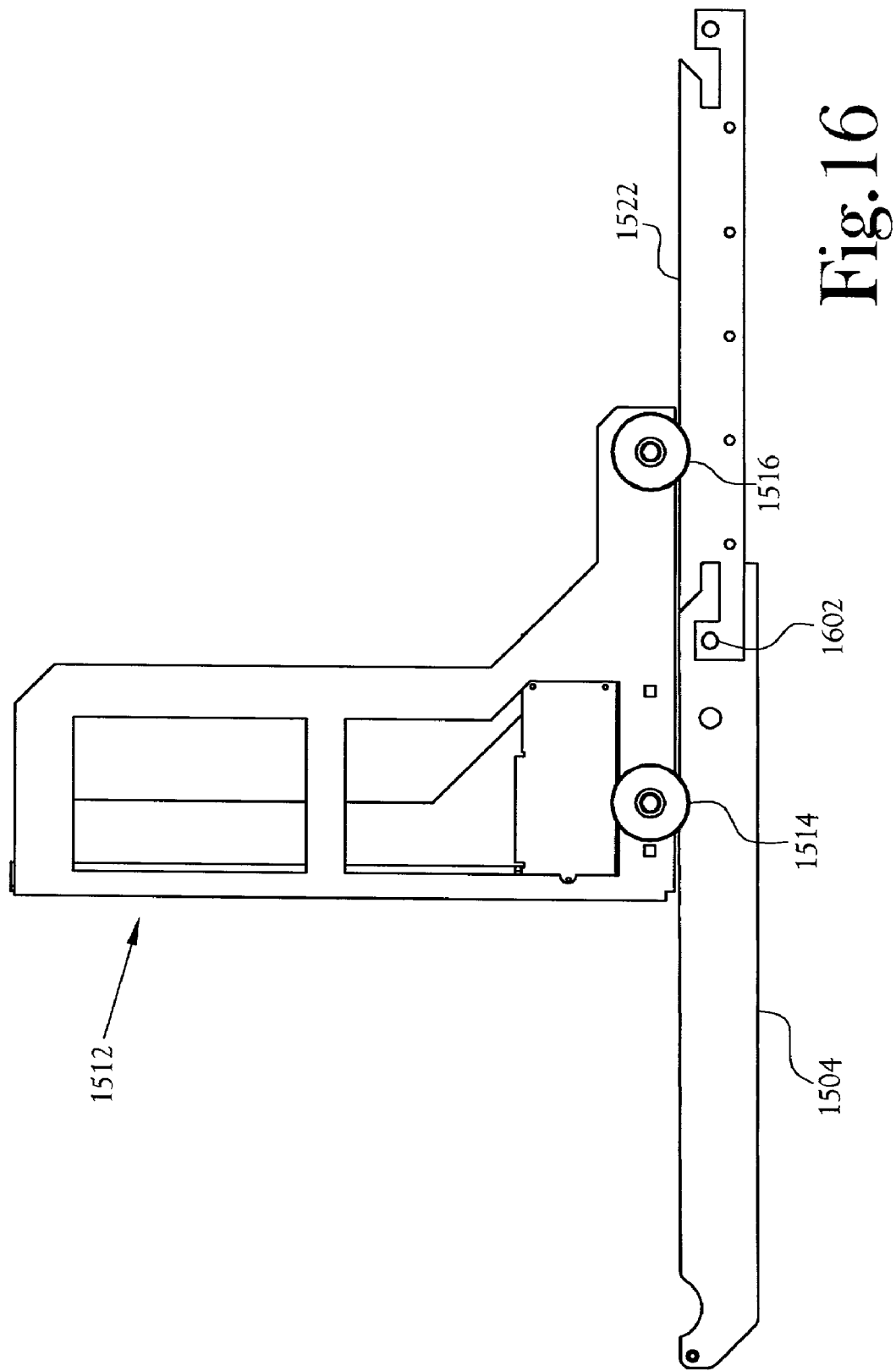
FIG. 16 is a side view of the contactor truck in the position as illustrated in FIG. 15.

FIGS. 15 and 16 illustrate the contactor truck 1512 in a partially removed position. The contactor truck 1512 supports the contactor assembly (not illustrated), and the truck 1512 aligns the contactor assembly when it is racked into the controller 102. The racking assembly 1504 is illustrated in the lowered position, where it serves as a rail for the wheels 1514 and 1516 of the truck 1512, allowing the truck 1512 to roll out of the cabinet 302 for removal from the controller 102. A stationary rail 1522 is aligned with the racking assembly 1504 and supports the wheels 1514 and 1516 when the truck 1512 is inside the cabinet 302.

Figure 17:
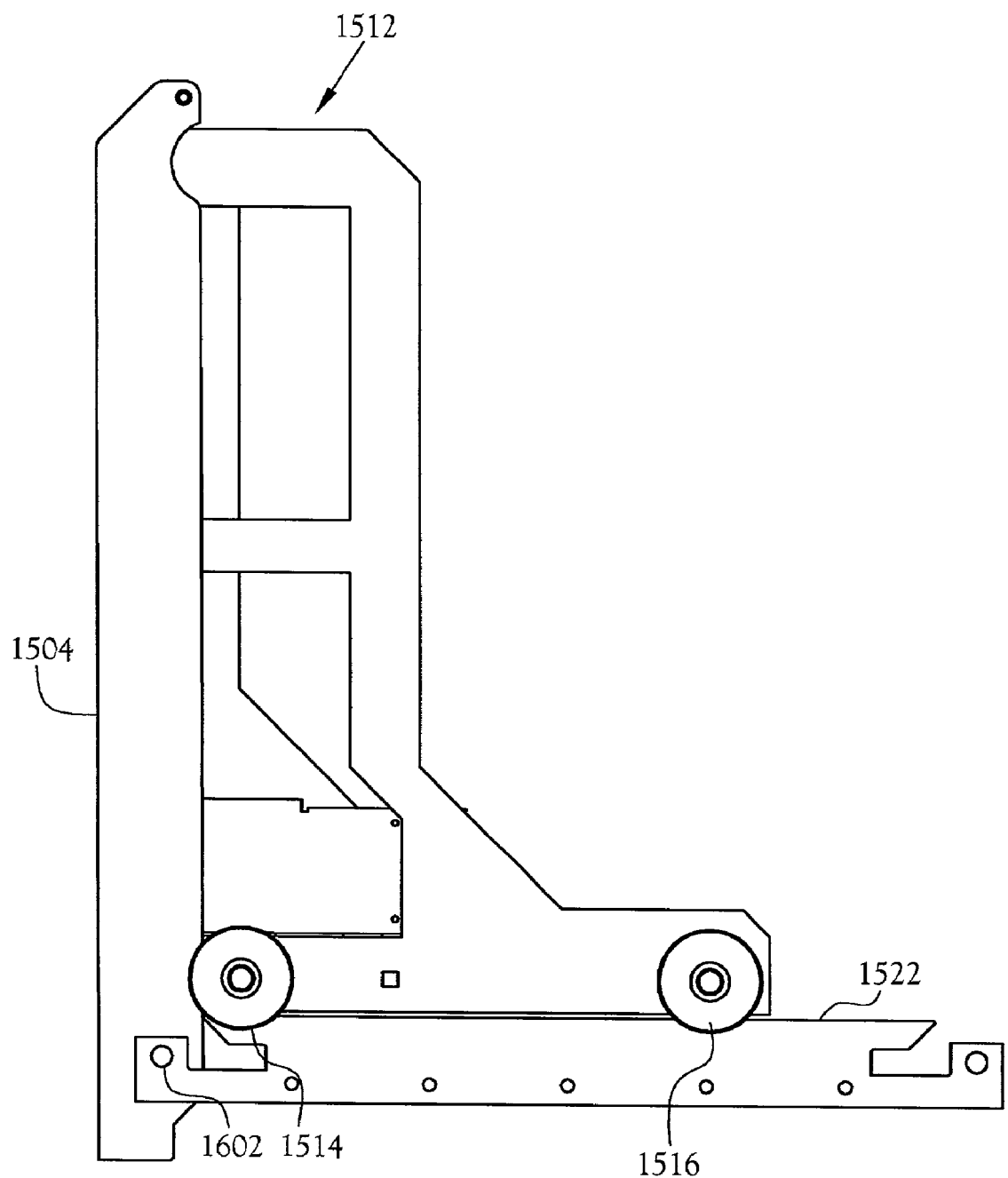
FIG. 17 is a plan view of the contactor truck in the fully inserted position.

FIG. 17 illustrates the racked truck 1512 with the racking assembly 1504 in the racked position. To rack the truck 1512, the truck 1512 is rolled into the cabinet 302 until resistance prevents it from being rolled further into the cabinet 302. The racking handle 1506 is raised, causing the racking assembly 1504 to rotate about a pivot point 1602. As the racking assembly 1504 rotates, the rail portion contacts the front portion of the wheels 1514 and forces the truck 1512 into the fully racked position. In one embodiment, an upper rail is positioned slightly above the wheels 1514 and 1516 and serves to prevent the wheels 1514 from being pushed off the lower stationary rail 1522 by the racking assembly 1504. To unrack, or remove, the truck 1512, the racking handle 1506 is pulled away from the truck 1512, causing the racking assembly 1504 to rotate about the pivot point 1602. When the racking assembly 1504 is in a horizontal position, the truck 1512 is withdrawn from the cabinet 302. The truck 1512 is removed from the cabinet 302 by rolling it out of the cabinet until the truck 1512 is in a position to be lifted from the rails of the racking assembly 1504.

Figure 18A:
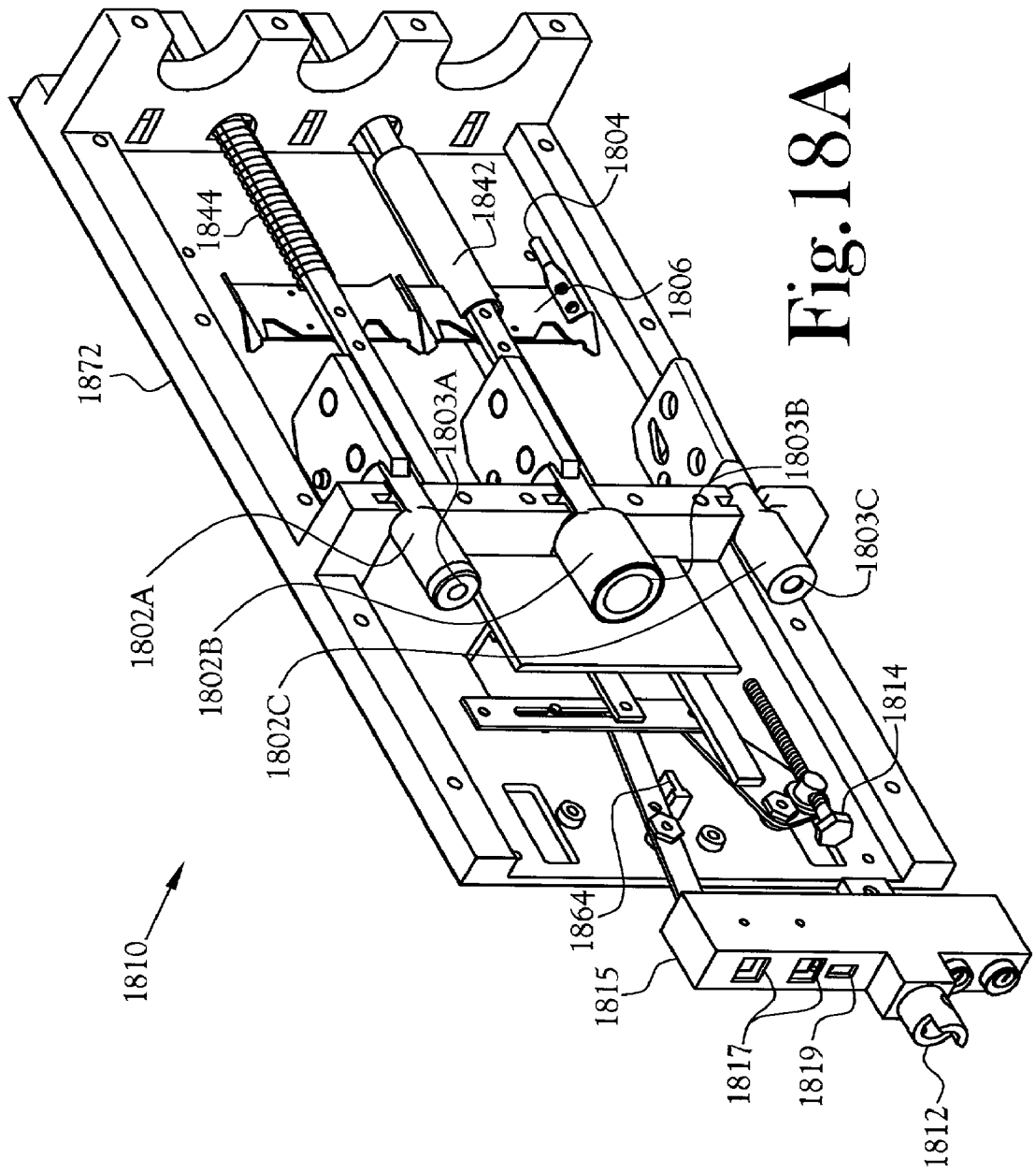
FIG. 18A is a perspective view of a load discharge device.

FIG. 18A illustrates a load discharge device (LDA), or load-cable earthing switch, 1810, which is an apparatus for grounding the load-side conductors when the contactor is in the open position. The LDA 1810 is illustrated schematically as a switch 214 in FIG. 2. The LDA 1810 illustrated in FIG. 18A is in the unearthed position, that is, the earthing bar 1806 is positioned away from the terminal lugs 1802 and the springs (only one spring 1844 is illustrated, the other is hidden by the insulating tube 1842) are charged, or compressed. The illustrated embodiments of the LDA 1810 are low-profile devices that occupy little more space than the load-side terminals. The LDA 1810 includes a molded base 1872 that secures many of the individual components. In one embodiment, the support plate 1874 is attached to the molded base 1872. In another embodiment, the support plate 1874 and the molded base 1872 form an integral piece.

The LDA operator 1815 has a racking connector 1812, which engages a racking screw 1814, and flag windows 1817 and 1819, which indicate the earthing switch 1810 position and LDA 1810 charged status. When tripped, the earthing bar 1806 is pushed by the springs 1844 against the terminal lugs 1802, causing the terminal lugs 1802 to be shorted and earthed through the earthing connection 1804. For illustration purposes, three different sizes of terminal lugs 1802A, 1802B, and 1802C are shown in FIG. 18A. Two lugs 1802A and 1802C each have a small opening 1803A and 1803C for receiving a conductor having a low or medium current rating. The center lug 1802B has a large opening 1803B for receiving a large conductor with a high current carrying capacity. The lugs 1802 are swaged to the conductors as illustrated in FIG. 10.

Figure 18B:
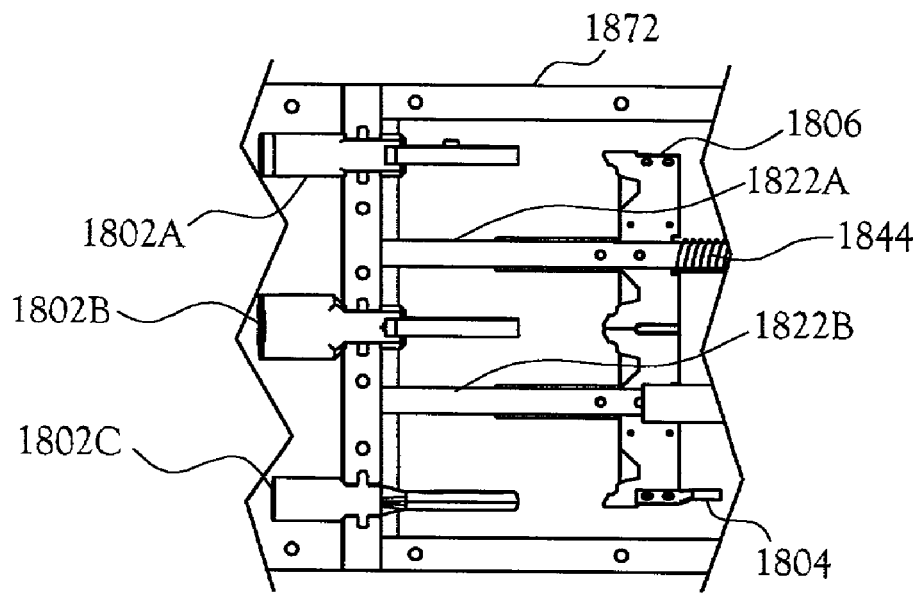
FIG. 18B is a plan view of a portion of the load discharge device, showing the device in the charged position.
Figure 18C:
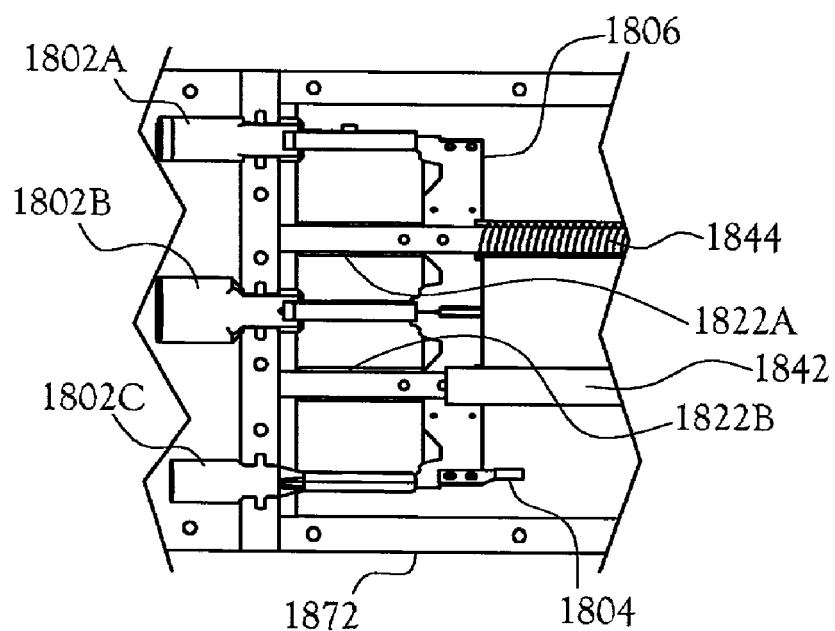
FIG. 18C is a plan view of a portion of the load discharge device, showing the device in the earthed position.

FIGS. 18B and 18C illustrate the position of the earthing bar 1806 with respect to the lugs 1802. In FIG. 18B, the earthing bar 1806 is in the ungrounded position and the LDA 1810 is charged and ready to earth the load-side conductors. In FIG. 18C, the earthing bar 1806 is in the earthing position; that is, the earthing bar 1806 is in contact with the grounding notch 1854 (see FIG. 18E) on each of the lugs 1802. The earthing bar 1806 engages a first end of the springs 1844 and has a grounding connector 1804 for connecting the earthing bar 1806 to earth. The second end of the springs 1844 rests against the base 1872. The springs 1844 provide the motive force for earthing by quickly forcing the earthing bar 1806 against the lugs 1802 when the LDA 1810 is tripped. In the embodiment illustrated in FIGS. 18A, 18B, and 18C, the earthing bar 1806 is a plate that contacts the springs 1844 and the lugs 1802. In another embodiment, illustrated in FIG. 18D, the earthing bar 1806' is a round bar that contacts the springs 1844 and the lugs 1802.

Figure 18D:
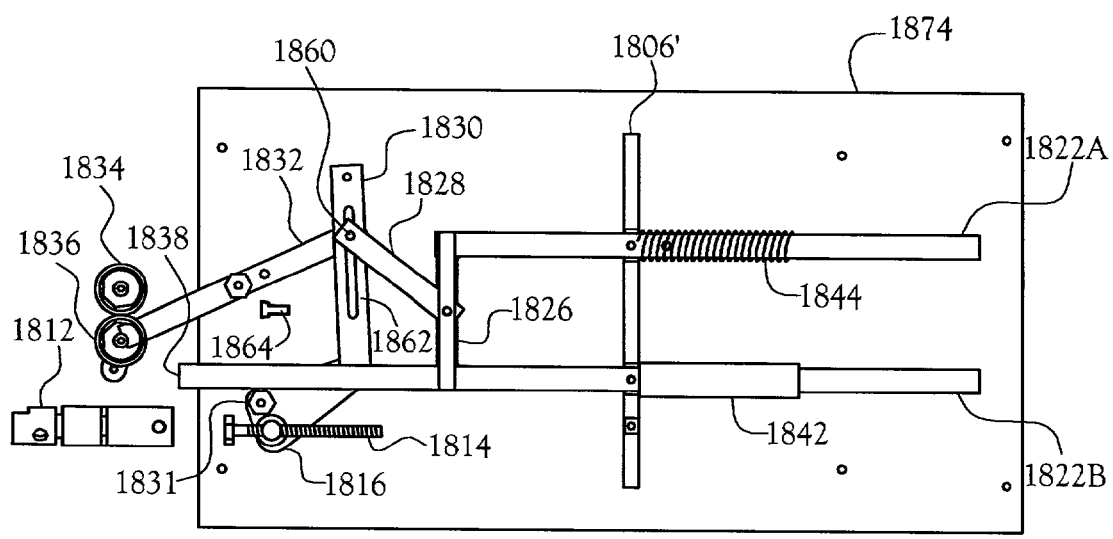
FIG. 18D is a plan view of the load discharge device scissors-type linkage.

FIG. 18D illustrates the position of the actuating mechanism and the charging mechanism on the support plate 1874 when the LDA 1810 is in the earthed position. As illustrated in FIG. 18A, when the LDA 1810 is charged, the scissors-type linkage first member 1832 and second member 1828 are aligned in an almost-straight-line alignment and have a common first pivot 1860 constrained in a slot 1862 in a third member 1830. Because the linkage members 1832 and 1828 are aligned with the pivot 1860 below the straight-line alignment position and the pivot 1860 is restrained from moving lower vertically by a stop 1864 on the backing plate 1874, the linkage members 1832 and 1828 are fixed in position by the springs 1844 and hold the linkage in a stable over-toggle position. The LDA 1810 is tripped by rotating the screw 1814 which rotates the plate 1816 about the hex nut pivot 1831. The counter-clockwise rotation of plate 1816 forces the vertical member 1830 upwards pushing the pivot 1860 vertically. This rotates the member 1832 out of the almost-straight-line alignment (toggle) with the member 1828. Once the pivot 1860 is above the straight-line alignment position, the members 1832 and 1828 no longer oppose the springs 1844. The unrestrained springs 1844 force the rails 1822A and 1822B and the connecting member 1826 to travel toward the vertical member 1830, causing members 1832 and 1828 to fold around the pivot 1860, such as scissors do when closing.

The rails 1822A and 1822B and the connecting member 1826 form a sliding member made of insulating material and have a shape similar to a sideways "h". The grounding bar 1806 bridges the rails 1822A and 1822B and operates in concert with the rails 1822A and 1822B. In one embodiment, the connecting member 1826 includes two insulating bars, each one attached to a side of the rails 1822A and 1822B. As the rails 1822A and 1822B move, so does the grounding bar 1806.

Once the pivot point 1860 is moved above the straight-line alignment, the force of the springs 1844 causes the pivot point 1860 to move at a high rate of speed along the slot 1862 in the vertical member 1830, and, consequently, the earthing bar 1806 is forced against the lugs 1802. The flags 1834 and 1836 are actuated by the member 1832, indicating the charged status of the LDA 1810 through the flag windows 1817. The lower rail 1822B moves longitudinally and its position corresponds to that of the earthing bar 1806. When the LDA 1810 is tripped and the load-cables are earthed, one end 1838 of the lower rail 1822B is visible from the window 1819 in the operator 1815.

The LDA operator 1815 includes a racking connector 1812, which receives a racking crank (not illustrated) and engages the racking screw 1814. The racking screw 1814 causes the member 1830 to move vertically and forces the scissors-type linkage members 1832 and 1828 into an almost-straight-line alignment.

Figure 18E:
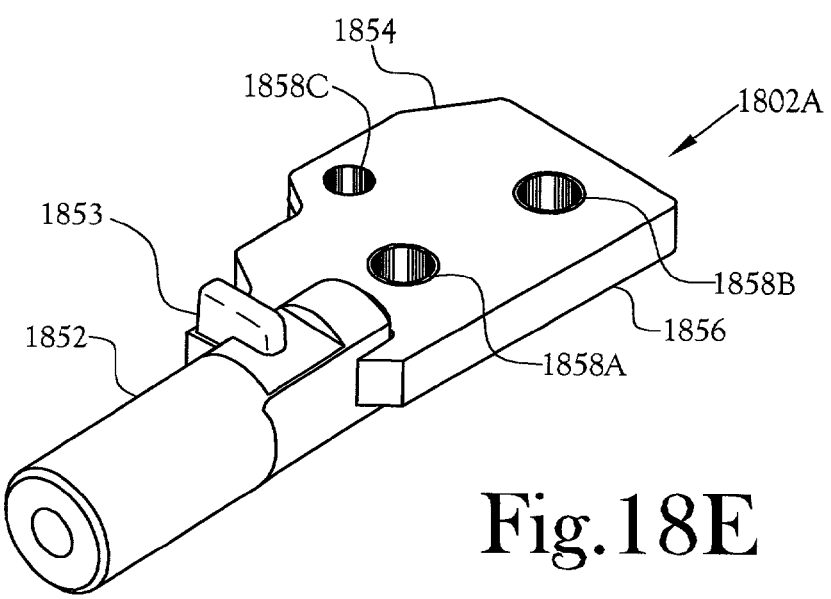
FIG. 18E illustrates a terminal lug for the load discharge device.

FIG. 18E illustrates terminal lug 1802A, which has a barrel 1852, a lug pad 1856, and a grounding bevel 1854. The grounding bevel 1854 forms a notch with the molded base 1872 when the lug 1802A is adjacent the molded base 1872. The lug pad 1856 has a flat surface for connecting the load-side cable terminal lug (not illustrated). The lug pad 1856 has two openings 1858A and 1858B, through which mounting fasteners pass and secure the load-side cable terminal connection. The lug 1802A has an opening 1803A that passes through the barrel 1852 and receives a cable conductor. The lug 1802A can be swaged to the conductor in a manner as illustrated in FIG. 10. Those skilled in the art will recognize that other means for connecting the conductor to the lug 1802A can be employed without departing from the spirit and scope of the present invention. The lug 1802A has a tang 1853 that protrudes perpendicular to the barrel 1852 and is received by a slot in the lug holder 1805. The tang 1853 secures the lug 1802A and prevents the lug 1802A from being displaced longitudinally when the earthing bar 1806 strikes the grounding bevel 1854. The opening 1858C receives a pin, fastener, or other positioning member that secures the lug 1802A and prevents the lug 1802A from being displaced orthogonally from the support plate 1874 when the earthing bar 1806 strikes the grounding bevel 1854.

Figure 19:
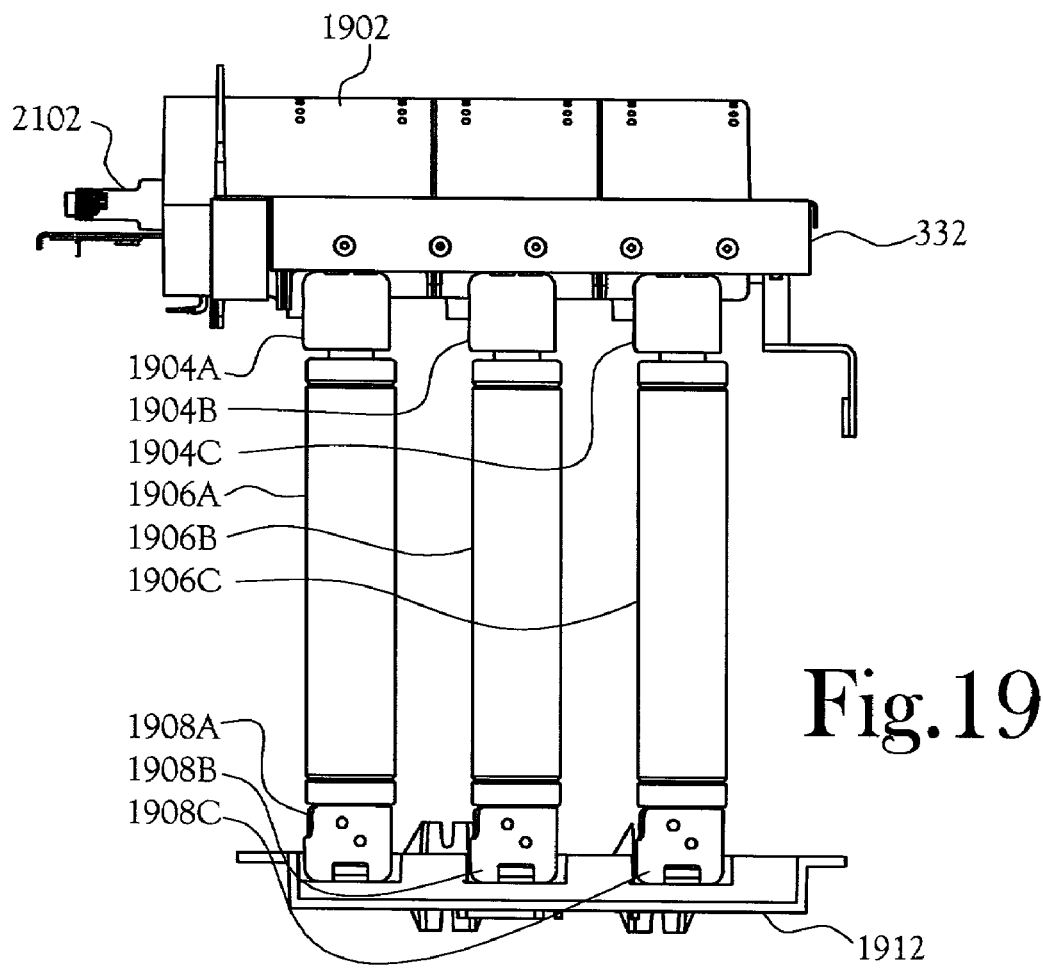
FIG. 19 illustrates the disconnect switch and the fuses.
Figure 20A:
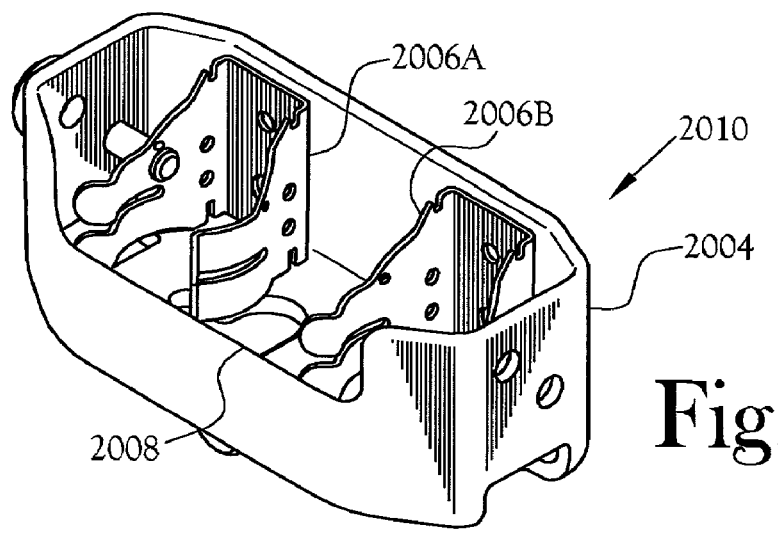
FIG. 20A illustrates a two-fuse holder.
Figure 20B:
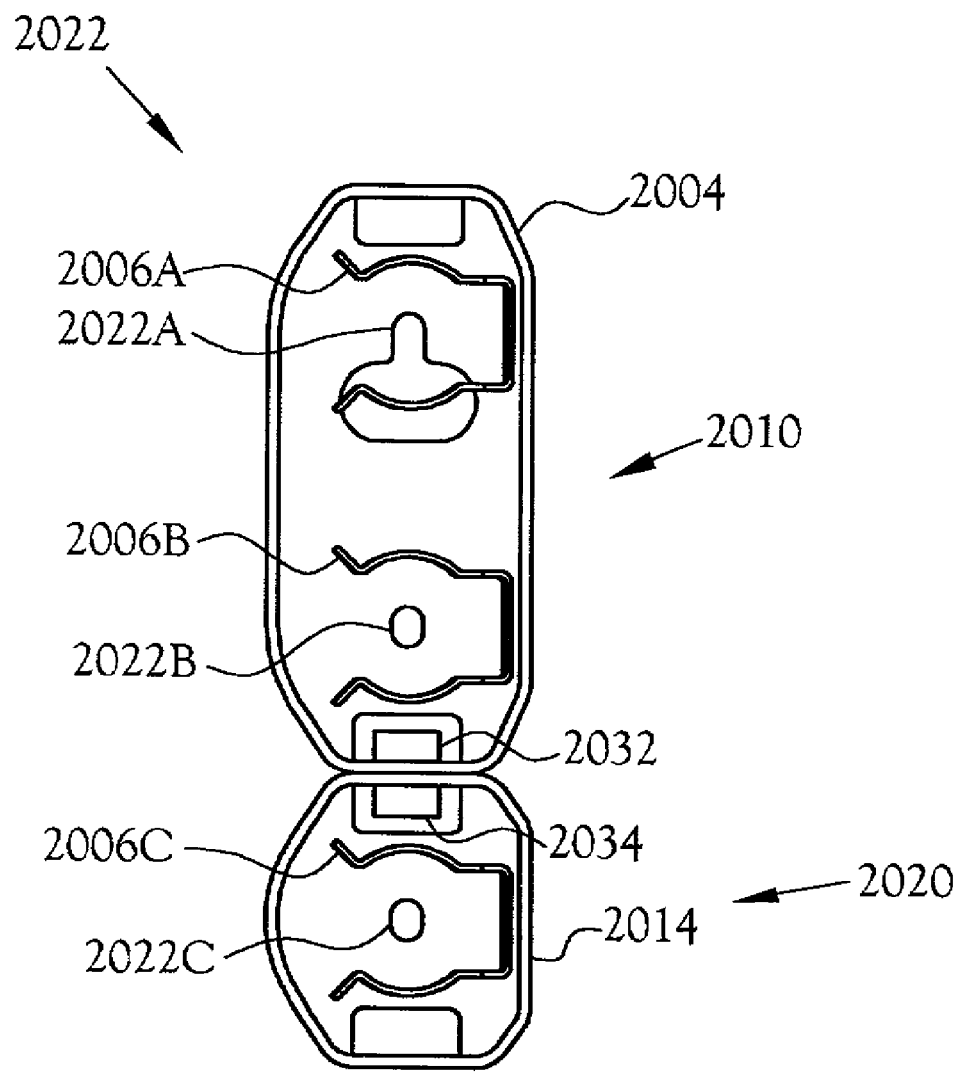
FIG. 20B illustrates a three-fuse holder assembly.

FIG. 19 illustrates the disconnect switch 1902 and the fuses 1906. The disconnect switch 1902 and the fuses 1906 are illustrated as the switch 204 and fuses 206 in FIG. 2. The disconnect switch 1902 is secured to a support plate 322, which is located in the mid-section of the cabinet 302 (illustrated in FIG. 3). The bottom portion of the lower disconnect switch contacts 2206 (illustrated in FIGS. 22 and 23) are the upper fuse holders 1904. The lower fuse holders 1908 are similar to the upper fuse holders 1904. The lower fuse holders 1908 are electrically connected to the contactor. The fuses 1906 are conventional fuses that provide overcurrent protection. Although FIG. 19 shows only a set of three fuses 1906A, 1906B, and 1906C, in various embodiments, either six or nine fuses can be used, with two or three fuses 1906 in parallel, respectively. Two fuses 1906 in parallel use a two-fuse holder 2010 as illustrated in FIG. 20A. Three fuses 1906 in parallel use a three-fuse holder assembly 2022 as illustrated in FIG. 20B. This configuration of fuses 1906 permits removal and replacement of the fuses 1906 without removing, or withdrawing, the contactor or disconnect switch 1902. Additionally, the operator of the disconnect switch 1902 is interlocked with the contactor door 304 such that the door 304 cannot be opened and the fuses 1906 or other high-voltage components cannot be accessed unless the disconnect switch 1902 is in the open position.

FIG. 20A illustrates a two-fuse holder 2010, such as the lower fuse holder 1908, which includes a pair of fuse clips 2006A and 2006B and an outer shroud 2004. FIG. 20B illustrates a top view of the fuse holder 2010 illustrated in FIG. 20A and a single fuse holder 2020, which is secured to the fuse holder 2010. The shrouds 2004, 2014 of the lower fuse holder 1908 include mounting holes 2022 for securing the shrouds 2004, 2014 to a support plate 1912. The shrouds 2004, 2014 of the upper fuse holder 1904 are cast with the lower disconnect switch contacts 2206 (illustrated in FIGS. 22 and 23) and do not have mounting holes 2022.

The fuse clips 2006 are conventional fuse clips that mate to the fuses 1906. Referring to FIG. 19, each fuse 1906 is installed by first seating the upper end of the fuse 1906 in the fuse clip 2006 in the upper fuse holder 1904, and then pushing the fuse 1906 into the fuse clip 2006 in the lower fuse holder 1908. Those skilled in the art will recognize that the fuse clips can be any type that mates with the type of fuse used in the controller 102 without departing from the spirit and scope of the present invention.

The shroud 2004 is formed of a single casting of aluminum, plated copper, or other conducting material and has rounded surfaces, which minimizes the electrical stress and reduces corona. The shroud 2004 surrounds the sides of the fuse clips 2006 and, for the lower fuse holder 1908, has a side opening 2008 for the fuse 1906 to be inserted into the fuse clip 2006. The upper fuse holder 1904 does not require the side opening 2008. In one embodiment, illustrated in FIGS. 22 and 23, the upper fuse holder 1904 includes rounded slots through which the engagement of the fuse 1906 can be inspected and to provide access to the fuse clip 2006.

FIG. 20B illustrates a three-fuse holder assembly 2022 including a two-fuse holder 2010 attached to a single fuse holder 2020 by a fastener 2032. Those skilled in the art will recognize that the fastener 2032 can be a bolt 2032 and nut 2034, a rivet, or other type of fastener without departing from the spirit and scope of the present invention.

Figure 21:
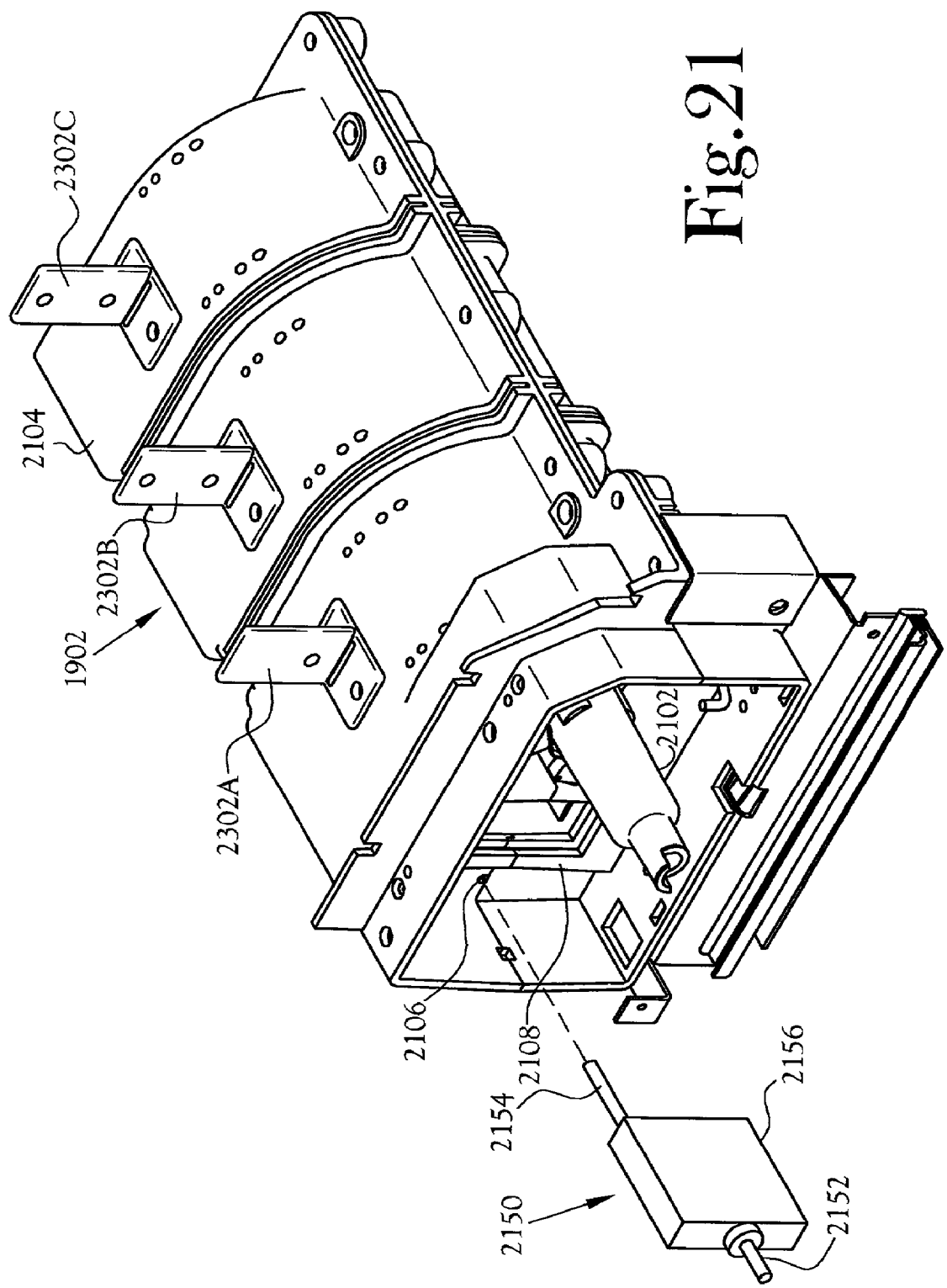
FIG. 21 illustrates the housing of the disconnect switch and a switch illuminator.

FIG. 21 illustrates a housing 2104 of the disconnect switch 1902 and a switch illuminator 2150. The housing 2104 includes a window 2108, through which the internals of the housing 2104 can be viewed. The disconnect switch 1902 includes an operator connector 2102, into which an operator handle fits. Rotating the operator handle, and the operator connector 2102, operates the disconnect switch 1902, which is shown schematically in FIG. 2 as the disconnect switch 204. The line-side connection is made directly to the bus connection tabs 2302 protruding above the housing 2104. This direct connection eliminate risers or other extraneous electrical connections to the disconnect switch 1902 and serves to reduce potential heat generating connections. The line-side bus is shown as the bus 202 on FIG. 2.

Figure 23:
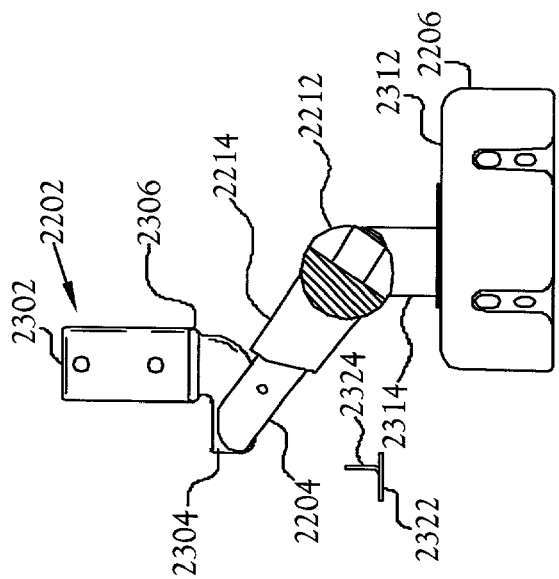
FIG. 23 illustrates a cross-section view of the internals of the disconnect switch.
Figure 22:
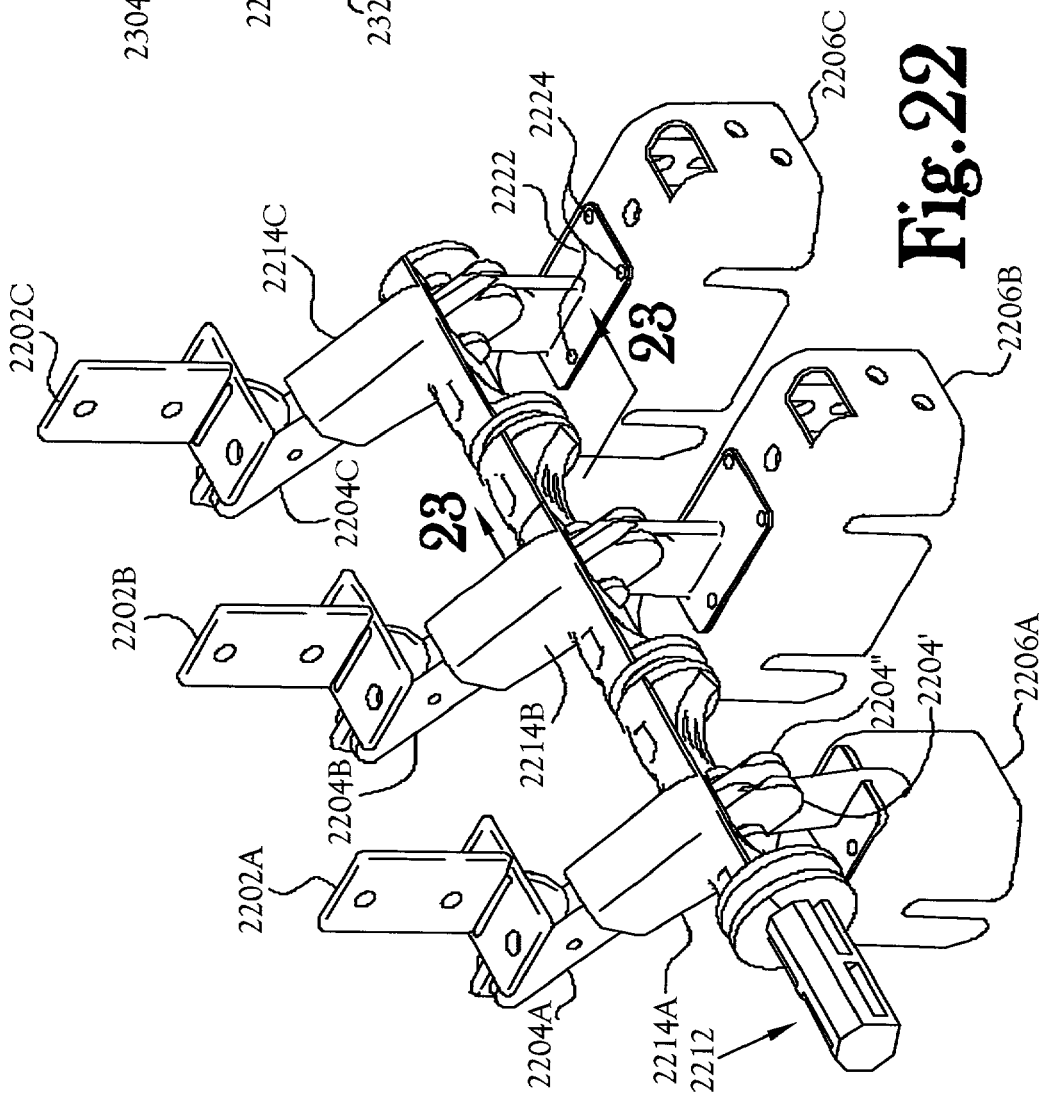
FIG. 22 illustrates the internals of the disconnect switch in the open position.

FIG. 22 illustrates the internals of the disconnect switch 1902 in the closed position, including the upper switch contacts 2204, the switch blades 2204, the operator shaft 2212, and the lower switch contacts 2206. FIG. 22 shows an embodiment of a lower switch contact 2206A having a single fuse holder 2020 (also shown on FIG. 20B). FIG. 22 also shows an embodiment of the lower switch contact 2206B and 2206C having a two-fuse holder 2010 (also shown on FIGS. 20A and 20B). FIG. 22 shows the two embodiments for illustrative purposes because, typically, only one embodiment would be used in a controller 102 at a time. FIG. 23 illustrates a cross-section view of the internals of the disconnect switch 1902 illustrated in FIG. 22, with the addition of the grounding stabs 2324 protruding from the grounding bar 2322, which grounds the load-side of the disconnect switch 1902 when the switch 1902 is in the open position. The grounding stabs 2324 and the grounding bar 2322 are not illustrated in FIG. 22. The illustrated embodiment of the disconnect switch 1902 has cast parts to minimize the number of components and reduce the number of heat generating connections.

Each upper switch contact 2202 includes a bus connection 2302, a mounting pad 2306, and an upper contact 2304. The upper switch contact 2202 is formed from a conductive material. The bus connection 2302 includes flat connection surfaces to which either bus bar or cable connectors can be bolted. The mounting pad 2306 has openings used to attach the upper switch contact 2202 to the housing 2104. Those skilled in the art will recognize that any of various types of fasteners can be used to secure the upper switch contact 2202 to the housing 2104 without departing from the spirit and scope of the present invention.

Each lower switch contact 2206 includes the lower contact 2314, a mounting pad 2222, and an upper fuse holder 2206. The lower switch contact 2206 is formed from a conductive material. The mounting pad 2222 has openings 2224 used to attach the lower switch contact 2206 to the housing 2104. Those skilled in the art will recognize that any of various types of fasteners can be used to secure the lower switch contact 2206 to the housing 2104 without departing from the spirit and scope of the present invention.

Each switch blade 2204 includes two flat bars 2204' and 2204" that sandwich the upper contact 2304 and a lower contact 2314. The switch blades 2204 are formed from a conductive material. The operator shaft 2212 is connected to the operator connector 2102 outside the housing 2104 and to the switch blade holders 2214 inside the housing 2104. Each switch blade holder 2214 contains a pair of parallel switch blades 2204' and 2204". Internally, the switch blade holders 2214 include springs that force the switch blades 2204 against the upper contact 2304 and the lower contact 2314 such that electrical continuity is established between the upper switch contact 2202 and the lower switch contact 2206 when the disconnect switch 1902 is positioned in the closed position illustrated in FIG. 22.

FIG. 23 illustrates a section view of the switch internals, including the grounding stab 2324 and the grounding bar 2322. As the operator shaft 2212 rotates counterclockwise, the switch blade holders 2214 cause the switch blades 2204 to rotate about the operator shaft 2212 towards the open position. With the disconnect switch 1902 in the open position, the switch blades 2204 have been rotated away from the upper contact 2304 and the electrical continuity between the upper switch contact 2202 and the lower switch contact 2206 is broken. The grounding stab 2324 is the same width as the upper contact 2304 and, when the switch 1902 is in the open position, the switch blades 2204 make electrical contact with the grounding stabs 2324, grounding the load-side of the disconnect switch 1902.

Figure 24:
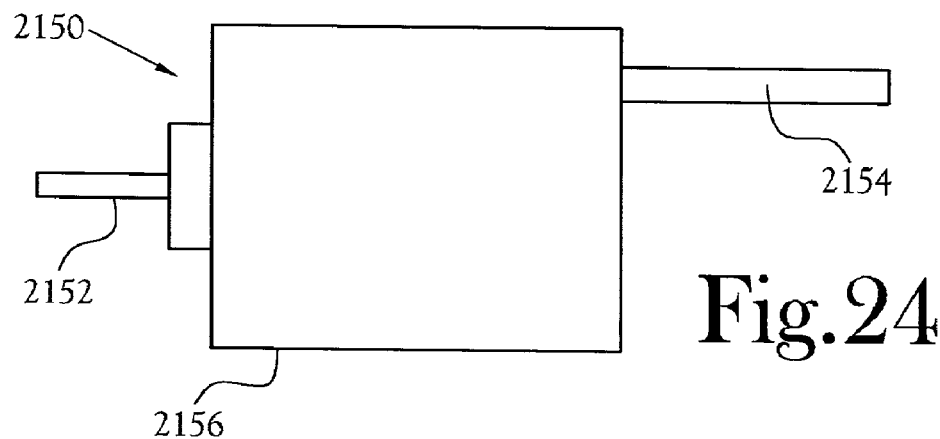
FIG. 24 illustrates a switch illuminator for illuminating the internals of the disconnect switch.
Figure 25:
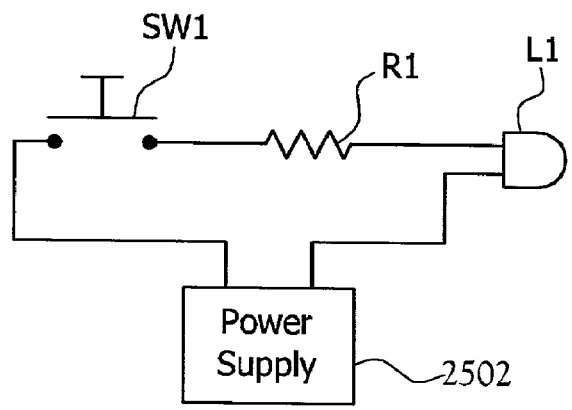
FIG. 25 illustrates a simple schematic diagram for the switch illuminator.

FIG. 24 illustrates the switch illuminator 2150 for illuminating the internals of the disconnect switch 1902. FIG. 25 illustrates a simple schematic diagram for the switch illuminator 2150. The switch illuminator 2150 includes a push-button switch SW1, a current limiting resistor R1, a power supply 2502, and an LED L1. The push-button switch SW1 has an actuator 2152 that extends from the illuminator case 2156. Extending from the opposite side of the illuminator case 2156 is a light pipe 2154, which can be the lens that is integral with the LED L1 or a separate optical pipe that collects the light emitted from LED L1 and pipes it to the disconnect switch 1902. The light pipe 2154 mates with an opening 2106 in the disconnect switch housing 2104. The power supply 2502 can be a portable power supply, such as a battery, or a permanent power supply, which can be obtained from the instrument compartment 1310 or other source in the controller 102.

The switch illuminator 2150 is a self-contained illuminator that eliminates the need for an operator to have a flashlight to view, through the window 2108 in the housing 2104, the interior of the disconnect switch 1902 and determine whether the disconnect switch 1902 is open or closed. Pushing on the actuator 2152 operates the switch SW1 and causes the light pipe 2154 to illuminate the interior of the disconnect switch 1902.

Figure 26:
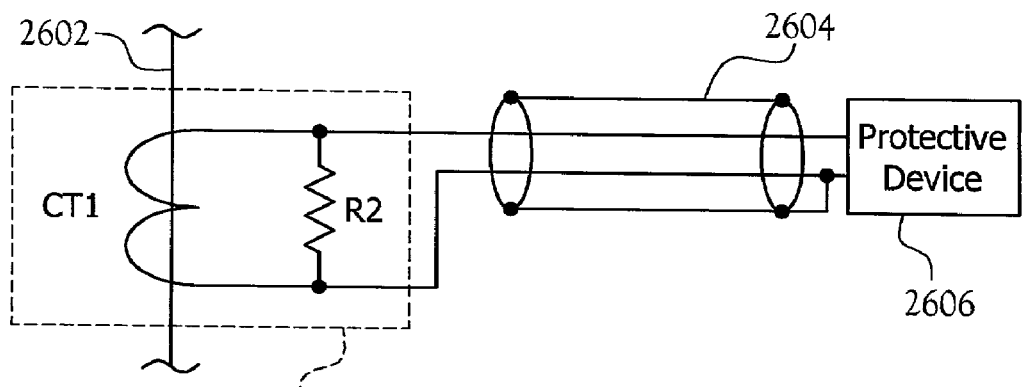
FIG. 26 illustrates a schematic of a low power current transformer.

FIG. 26 illustrates a schematic of a low power current transformer 2610. Prior art current transformers are sized for the current flow to be detected. Prior art current transformers have a ratio based on the current to be detected, for example, 25/5 and 800/5. The low power current transformer 2610 detects a wide current range and is suitable for measuring any current in the range from 0 amperes to 800 amperes, or more. The low power current transformer 2610 is illustrated as the current transformers 216A, 216B, 216C, and 218 on FIG. 2.

The low power current transformer 2610 includes a winding CT1, through which the current carrying conductors 2602 pass, and a resistor R2. In one embodiment, the low power current transformer 2610 is mounted on a chassis that supports the draw-out stabs that mate with the contactor. The conductors 2602 are electrically connected to the draw-out stabs and, in one embodiment, the conductors 2602 include all three phases of the load. In another embodiment, the conductor 2602 is a single phase of the load. Across the secondary winding CT1 is a resistor R1, which is connected to the protective device 2606 through a grounded shielded cable 2604. In one embodiment, the resistor R1 is molded in a protective casing that also protects the winding CT1. The protective device 2606 is responsive to a voltage signal that represents the current flow through the primary of CT1. In another embodiment, the shielded cable 2604 connects to a meter or other transducer, which provides current indication. In one embodiment, the shielded cable 2604 is grounded to one conductor. In another embodiment, the shielded cable 2604 has an isolated ground.

In one embodiment, the secondary winding CT1 is a conventional 2500/1 current transformer, the resistor R2 has a value of 0.5625 ohms, and the output of the low power current transformer 2610 is 22.5 millivolts per 100 amps through the primary of CT1. In another embodiment, the resistor R2 has a resistance of 0.2475 ohms.

Figure 27:
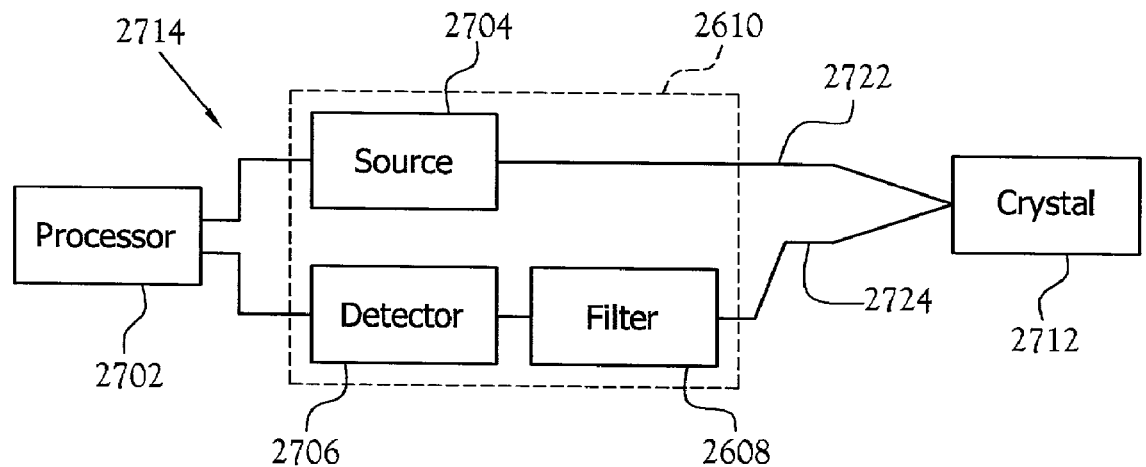
FIG. 27 illustrates a block diagram of an internal temperature monitoring system.

FIG. 27 illustrates a block diagram of an internal temperature monitoring system 2714. The internal temperature monitoring system 2714 permits direct temperature monitoring of specific components and eliminates the need for remote and less precise temperature monitoring systems. The internal temperature monitoring system 2714 uses a ruby crystal 2712 in direct contact with the component to be monitored. Components that can be monitored include the bus connections to the disconnect switch 1902, the draw-out stabs, the fuse holders 1904 and 1908, the load-side terminations made at the LDA 1810, and any other component that is subject to temperature variations.

The ruby crystal 2712 is excited by a source S1 signal generated by a source 2704 and transmitted over a source fiber optic cable 2722. The fluorescence signal S2 is captured by a detector fiber optic cable 2724, passed through a filter 2708, and sensed by a detector 2706. The fiber optic cables 2722 and 2724 are non-conductive and have a high dielectric strength.

Figure 28:
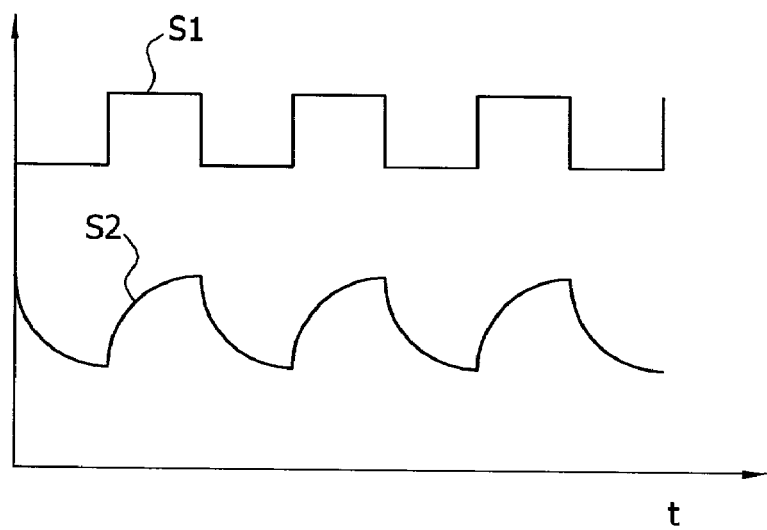
FIG. 28 illustrates the waveforms for the source and reflected optical signals.

FIG. 28 illustrates the waveforms for the source S1 and fluorescence S2 signals. The source signal S1 is a square wave pulsed signal that excites the ruby crystal 2712. The fluorescence signal S2 produced by the crystal 2712 varies according to the temperature of the crystal 2712.

The processor 2702 monitors the source 2704 and receives the output of the detector 2706 to determine the temperature of the crystal 2712. In one embodiment, the processor 2702 has a bistable output that changes state when the temperature of the crystal 2712 reaches a set value. In another embodiment, the processor 2702 has an output corresponding to the temperature of the crystal 2712.

From the foregoing description, it will be recognized by those skilled in the art that a medium voltage motor controller has been provided.

While the present invention has been illustrated by description of several embodiments and while the illustrative embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus, and illustrative examples shown and described. Accordingly, departures may be made from such details without departing from the spirit or scope of applicants' general inventive concept.

Having thus described the aforementioned invention, we claim:

1. A cabinet for enclosing a controller, said controller being subject to arcing, which produces arc gasses, said cabinet comprising:
   a plurality of walls for enclosing said controller;
   a roof panel connected to said plurality of walls;
   an exhaust vent for discharging built up gasses generated during an arc fault event;
   a floor panel connected to said plurality of walls; and
   a door for accessing said controller and maintaining integrity of said cabinet during said arc fault event.
   a first member disposed parallel to one of said plurality of walls;
   a second member connecting said first member to said one of said plurality of walls;
   a hinge connecting said door to one of said first member, said second member, and said one of said plurality of walls;
   a channel attached to said door and extending over said hinge, said channel adapted for receiving an edge of said first member, said edge opposite said second member; and
   a resilient seal disposed between said edge and said channel as said channel is forced toward said edge of said first member due to arc gasses produced during arcing.

2. The cabinet of claim 1 further comprising a latching mechanism for releasably securing said door in a closed position, said latch mechanism including a plurality of latch hooks and a strike assembly receiving said plurality of latch hooks such that said door remains sealed during said arcing.

3. The cabinet of claim 1 further comprising:
   an opening bounded by a wall edge of one of said plurality of walls;
   an access panel having a first surface and a first panel edge with a protruding member extending toward said wall edge; and
   a resilient seal disposed between said first surface of said access panel and said wall edge.

4. The cabinet of claim 1 further comprising:
   an opening bounded by a first edge of one of said plurality of walls and by a second edge of another one of said plurality of walls;
   an access panel having a first surface and a second surface, a first panel edge with a first protruding member extending toward said first edge, and a second panel edge with a second protruding member extending toward said second edge,
   a first resilient seal disposed between said first surface of said access panel and said first edge; and
   a second resilient seal disposed between said second surface of said access panel and said second edge.

5. A cabinet for enclosing a controller, said controller being subject to arcing, which produces arc gasses, said cabinet comprising:
   a plurality of walls for enclosing said controller;
   a roof panel connected to said plurality of walls;
   a floor panel connected to said plurality of walls;

an exhaust vent for discharging said arc gasses;
a flap covering said exhaust vent, said flap adapted to open and allow said arc gasses to escape;
a hinge connecting said flap to said cabinet;
a door for accessing said controller;
a latching mechanism for releasably securing said door in a closed position, said latch mechanism including a plurality of latch hooks and a strike assembly receiving said plurality of latch hooks such that said door remains sealed during said arcing;
a first member disposed parallel to one of said plurality of walls;
a second member connecting said first member to said one of said plurality of walls;
a hinge connecting said door to one of said first member, said second member, and said one of said plurality of walls;
a channel attached to said door and extending over said hinge, said channel adapted for receiving an edge of said first member; and
a resilient door seal disposed between said edge and said channel as said channel is forced toward said edge of said first member due to arc gasses produced during arcing.

6. The cabinet of claim 5 further comprising:
an opening bounded by a first inwardly turned edge of one of said plurality of walls and by a second inwardly turned edge of another one of said plurality of walls;
an access panel having a first surface and a second surface, a first outwardly turned panel edge with a first protruding member extending toward said first inwardly turned edge, and a second outwardly turned panel edge with a second protruding member extending toward said second inwardly turned edge,
a first resilient seal disposed between said first surface of said access panel and said first inwardly turned edge; and
a second resilient seal disposed between said second surface of said access panel and said second inwardly turned edge.

7. The cabinet of claim 5 further comprising:
a first dimple in a first surface selected from one of said roof panel, said floor panel, one of said plurality of walls, and a structural member; and
a second dimple in a second surface selected from one of said roof panel, said floor panel, one of said plurality of walls, and said structural member, said second dimple adapted to mate with said first dimple.

8. The cabinet of claim 5 further comprising:
a first opening in said first surface being center aligned within said first dimple;
a second opening in said second surface being center aligned within said second dimple and in register with said first opening when said first dimple is mated with said second dimple; and
a fastener disposed in said first opening and said second opening, said fastener securely mating said first and second dimples such that said mated dimples provide an increased shear strength to said fastener.

9. The cabinet of claim 5 further comprising a baffle for isolating a first volume of said cabinet from a second volume of said cabinet, said baffle connected to at least two of said plurality of walls.

10. A cabinet for enclosing a controller, said controller being subject to arcing, which produces arc gasses, said cabinet comprising:
a plurality of walls for enclosing said controller;
a door for accessing said controller, said door including a latching mechanism for releasably securing said door in a closed position, said latch mechanism including a plurality of latch hooks and a strike assembly receiving said plurality of latch hooks such that said door remains sealed during said arcing;
a first member disposed parallel to one of said plurality of walls;
a second member connecting said first member to said one of said plurality of walls;
a hinge connecting said door to one of said first member, said second member, and said one of said plurality of walls;
a channel attached to said door and extending over said hinge, said channel adapted for receiving an edge of said first member; and
a resilient door seal disposed in said channel for sealing a gap between said edge and said channel as said channel is forced toward said edge of said first member due to arc gasses produced during arcing.

11. The cabinet of claim 10, further comprising:
a baffle for isolating a first volume of said cabinet from a second volume of said cabinet, said baffle connected to at least two of said plurality of walls, said first volume containing said arc gasses;
at least one dimple in at least two of said plurality of walls; and
at least two dimples in said baffle, said baffle dimples adapted to mate with said wall dimples thereby providing a high shear strength attachment between said plurality of walls and said baffle.

12. The cabinet of claim 11 further comprising
an aperture centrally defined in each of said wall dimples and in each of said baffle dimples such that said apertures in said wall dimples are in register with said apertures in said baffle dimples when said wall dimples are mated with said baffle dimples; and
a fastener disposed in said registered apertures of said wall dimples and said baffle dimples, said mated dimples providing increased shear strength to said fastener securing said walls to said baffle.

13. The cabinet of claim 10 further comprising:
an opening bounded by a first inwardly turned edge of one of said plurality of walls and by a second inwardly turned edge of another one of said plurality of walls;
an access panel having a first surface and a second surface, a first outwardly turned panel edge with a first protruding member extending toward said first inwardly turned edge, and a second outwardly turned panel edge with a second protruding member extending toward said second inwardly turned edge,
a first resilient seal disposed between said first surface of said access panel and said first inwardly turned edge; and
a second resilient seal disposed between said second surface of said access panel and said second inwardly turned edge.

14. The cabinet of claim 10, further comprising:
a plurality of structural members
a roof panel connected to said plurality of walls;
a floor panel connected to said plurality of walls;
a plurality of dimples, at least one dimple being defined in each of said plurality of structural members, said plurality of walls, said roof panel and said floor panel, each of said plurality of dimples defining a central aperture and being configured for mating with another of said plurality of dimples such that said central apertures of mated dimples are generally aligned; and a plurality of fastening devices, one being received in said generally aligned central apertures of mated dimples, said mated dimples providing increased shear strength between said plurality of structural members, said plurality of walls, said roof panel and said floor panel of said cabinet.

* * * * *